US011063706B2

(12) United States Patent
Chang et al.

(10) Patent No.: US 11,063,706 B2
(45) Date of Patent: Jul. 13, 2021

(54) HYBRID AUTOMATIC REPEAT REQUEST (HARQ) FOR GRANT-LESS UPLINK (GUL) AND SCHEDULED UPLINK (SUL) IN LICENSED ASSISTED ACCESS (LAA) SYSTEMS

(71) Applicant: Apple Inc., Cupertino, CA (US)

(72) Inventors: Wenting Chang, Beijing (CN); Huaning Niu, Milpitas, CA (US); Salvatore Talarico, Sunnyvale, CA (US); Qiaoyang Ye, San Jose, CA (US); Anthony Lee, San Diego, CA (US); Seau S. Lim, Swindon (GB)

(73) Assignee: Apple Inc., Cupertino, CA (US)

( * ) Notice: Subject to any disclaimer, the term of this patent is extended or adjusted under 35 U.S.C. 154(b) by 84 days.

(21) Appl. No.: 16/494,544

(22) PCT Filed: Apr. 13, 2018

(86) PCT No.: PCT/US2018/027532
§ 371 (c)(1),
(2) Date: Sep. 16, 2019

(87) PCT Pub. No.: WO2018/191644
PCT Pub. Date: Oct. 18, 2018

(65) Prior Publication Data
US 2020/0396026 A1    Dec. 17, 2020

(30) Foreign Application Priority Data

Jun. 13, 2017   (WO) ................ PCT/CN2017/088087

(51) Int. Cl.
*H04L 1/18*       (2006.01)
*H04W 76/11*   (2018.01)
(Continued)

(52) U.S. Cl.
CPC ........... *H04L 1/1819* (2013.01); *H04W 24/08* (2013.01); *H04W 72/042* (2013.01);
(Continued)

(58) Field of Classification Search
CPC ..... H04L 1/1819; H04W 76/11; H04W 76/27; H04W 24/08; H04W 72/042; H04W 72/1268; H04W 72/1284; H04W 74/0808
See application file for complete search history.

(56) References Cited

U.S. PATENT DOCUMENTS

2014/0044028 A1   2/2014  Nammi et al.
2015/0139155 A1   5/2015  Wang et al.
(Continued)

FOREIGN PATENT DOCUMENTS

WO     2009/114401 A1    9/2009

OTHER PUBLICATIONS

"Considerations on DL/UL scheduling design for URLLC", R1-1704921, 3GPP TSG RAN WG1 Meeting #88bis, Spokane, USA, (Mar. 25, 2017), 5 pgs.

(Continued)

*Primary Examiner* — Jael M Ulysse
(74) *Attorney, Agent, or Firm* — Kowert Hood Munyon Rankin and Goetzel PC

(57) ABSTRACT

Embodiments of an Evolved Node-B (eNB), User Equipment (UE) and methods for communication are generally described herein. The eNB may receive, from a UE, uplink control information (UCI) that indicates a hybrid automatic repeat request identifier (HARQ ID) for a grant-less uplink (GUL) transmission by the UE during a first sub-frame. The eNB may select, from candidate HARQ IDs, a HARQ ID for a scheduled uplink (SUL) transmission by another UE in a second sub-frame after the first sub-frame. The eNB may, if the GUL transmission is successfully decoded, include the (Continued)

HARQ ID for the GUL transmission in the candidate HARQ IDs for the GUL transmission. The eNB may, if the GUL transmission is not successfully decoded, exclude the HARQ ID for the GUL transmission from the candidate HARQ IDs for the GUL transmission.

23 Claims, 13 Drawing Sheets

(51) Int. Cl.
*H04W 76/27* (2018.01)
*H04W 24/08* (2009.01)
*H04W 72/04* (2009.01)
*H04W 72/12* (2009.01)
*H04W 74/08* (2009.01)

(52) U.S. Cl.
CPC ... *H04W 72/1268* (2013.01); *H04W 72/1284* (2013.01); *H04W 74/0808* (2013.01); *H04W 76/11* (2018.02); *H04W 76/27* (2018.02)

(56) References Cited

U.S. PATENT DOCUMENTS

2017/0288817 A1* 10/2017 Cao ................... H04L 1/1819
2017/0290052 A1* 10/2017 Zhang ................ H04W 74/004
2017/0310431 A1* 10/2017 Iyer ................... H04L 1/1816
2017/0367110 A1* 12/2017 Li ..................... H04W 74/0816

OTHER PUBLICATIONS

"International Application Serial No. PCT/US2018/027532, International Search Report dated Sep. 14, 2018", 4 pgs.
"International Application Serial No. PCT/US2018/027532, Written Opinion dated Sep. 14, 2018", 10 pgs.
ZTE, "Discussion on grant-free transmission based on sensing", R1-1609801, 3GPP TSG RAN WG1 Meeting #86bis, Lisbon, Portugal, (Sep. 30, 2016), 4 pgs.
Zte, et al., "HARQ for URLLC UL Grant-free transmission", R1-1704428, 3GPP TSG RAN WG1 Meeting #88bis, Spokane, USA, (Mar. 25, 2017), 5 pgs.
European Search Report for Application No. EP18784910.4, dated Dec. 8, 2020, 12 pgs.

* cited by examiner

HYBRID AUTOMATIC REPEAT REQUEST (HARQ) FOR GRANT-LESS UPLINK (GUL) AND SCHEDULED UPLINK (SUL) IN LICENSED ASSISTED ACCESS (LAA) SYSTEMS

PRIORITY CLAIM

This application is a U.S. National Stage Filing under 35 U.S.C. 371 from International Application No. PCT/US2018/027532, filed Apr. 13, 2018 and published in English as WO 2018/191644 on Oct. 18, 2018, which claims priority to United States Provisional Patent Application Ser. No. 62/485,768, filed Apr. 14, 2017, and to International Application No. PCT/CN2017/088087, filed Jun. 13, 2017, all of which are incorporated herein by reference in their entirety.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks. Some embodiments relate to Fifth Generation (5G) networks. Some embodiments relate to New Radio (NR) networks. Some embodiments relate to license assisted access (LAA) techniques. Some embodiments relate to hybrid automatic repeat request (HARQ) techniques.

BACKGROUND

In some scenarios, a base station and mobile devices may communicate in accordance with license assisted access (LAA) techniques. The mobile devices may access the wireless medium using contention based access or scheduled access by the base station. In some cases, a combination of these two types of access may be used, which may provide challenges. For instance, a mobile device may attempt to access the channel during a first period that overlaps a second period in which the base station has attempted to schedule access by the mobile device. In this scenario and others, there is a general need for methods and systems to enable LAA operation.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
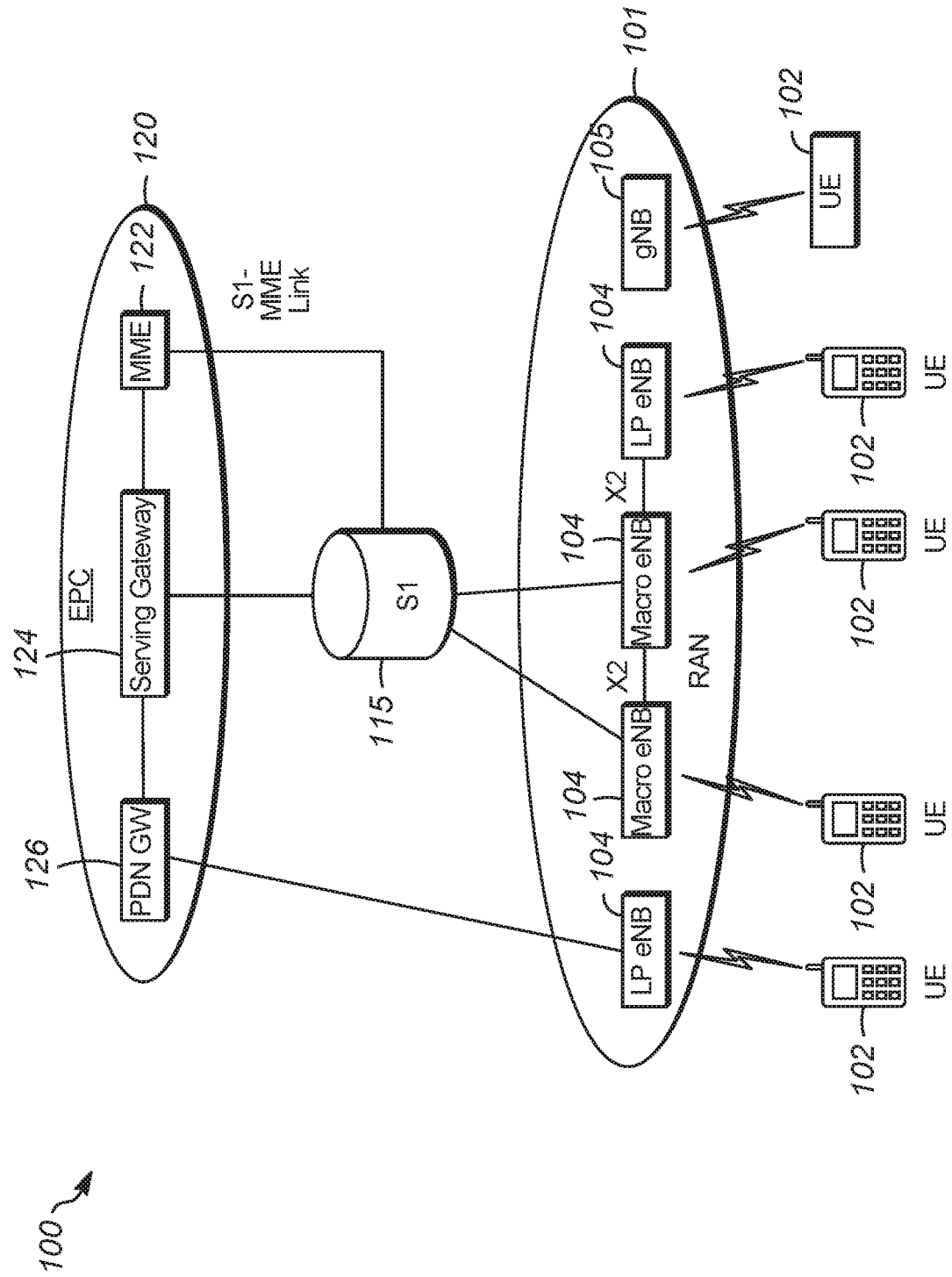
FIG. 1A is a functional diagram of an example network in accordance with some embodiments.
Figure 1B:
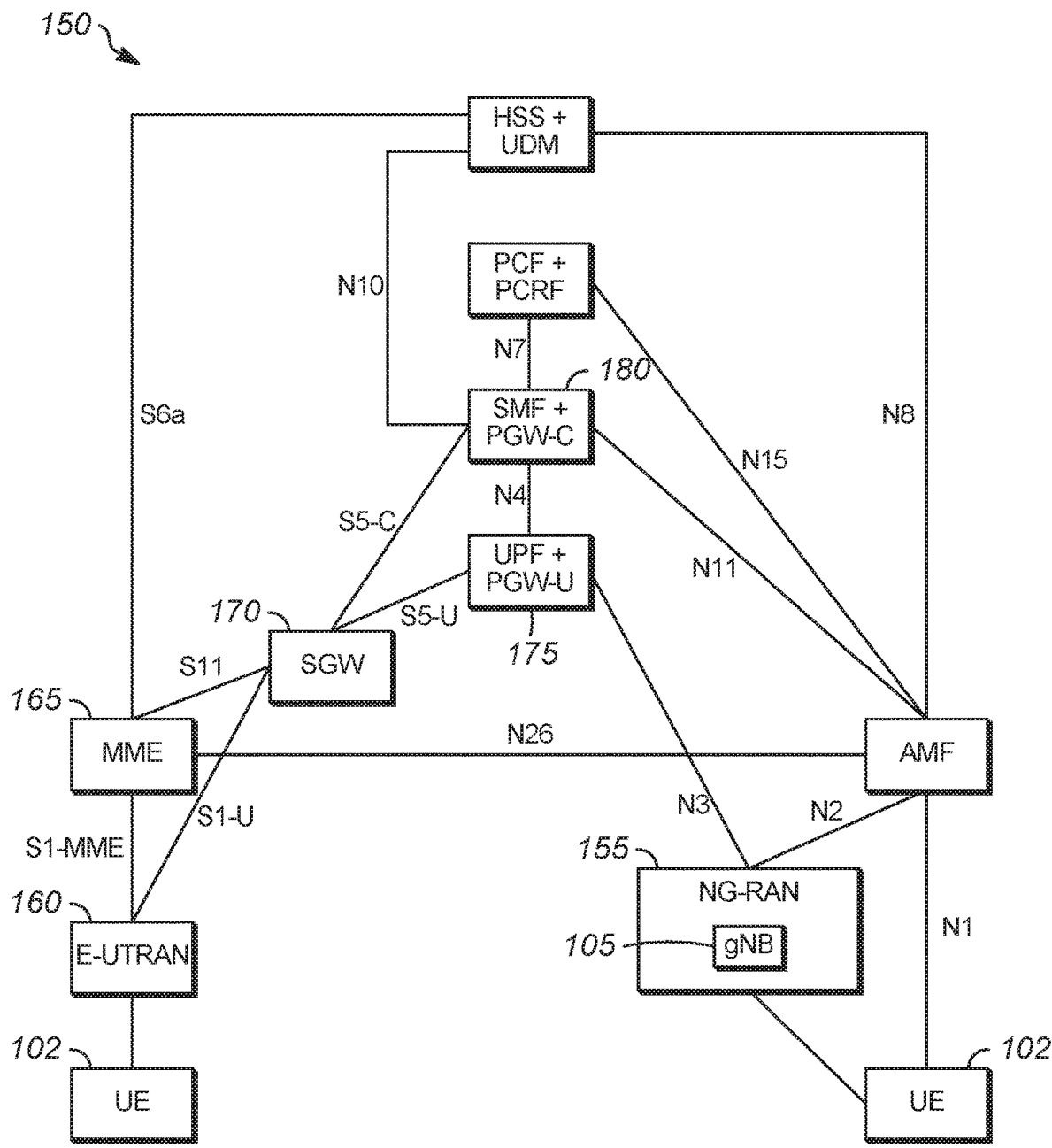
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, an LTE (E-UTRAN) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102, eNBs 104 and/or gNBs 105 may be configured to operate in accordance with an NR protocol and/or NR techniques. References to a UE 102, eNB 104 and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-gNB handovers and/or inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 and/or gNBs 105 (macro and micro) terminate the air interface protocol and may be the first point of contact for a UE 102. In some embodiments, an eNB 104 and/or gNB 105 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The the component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
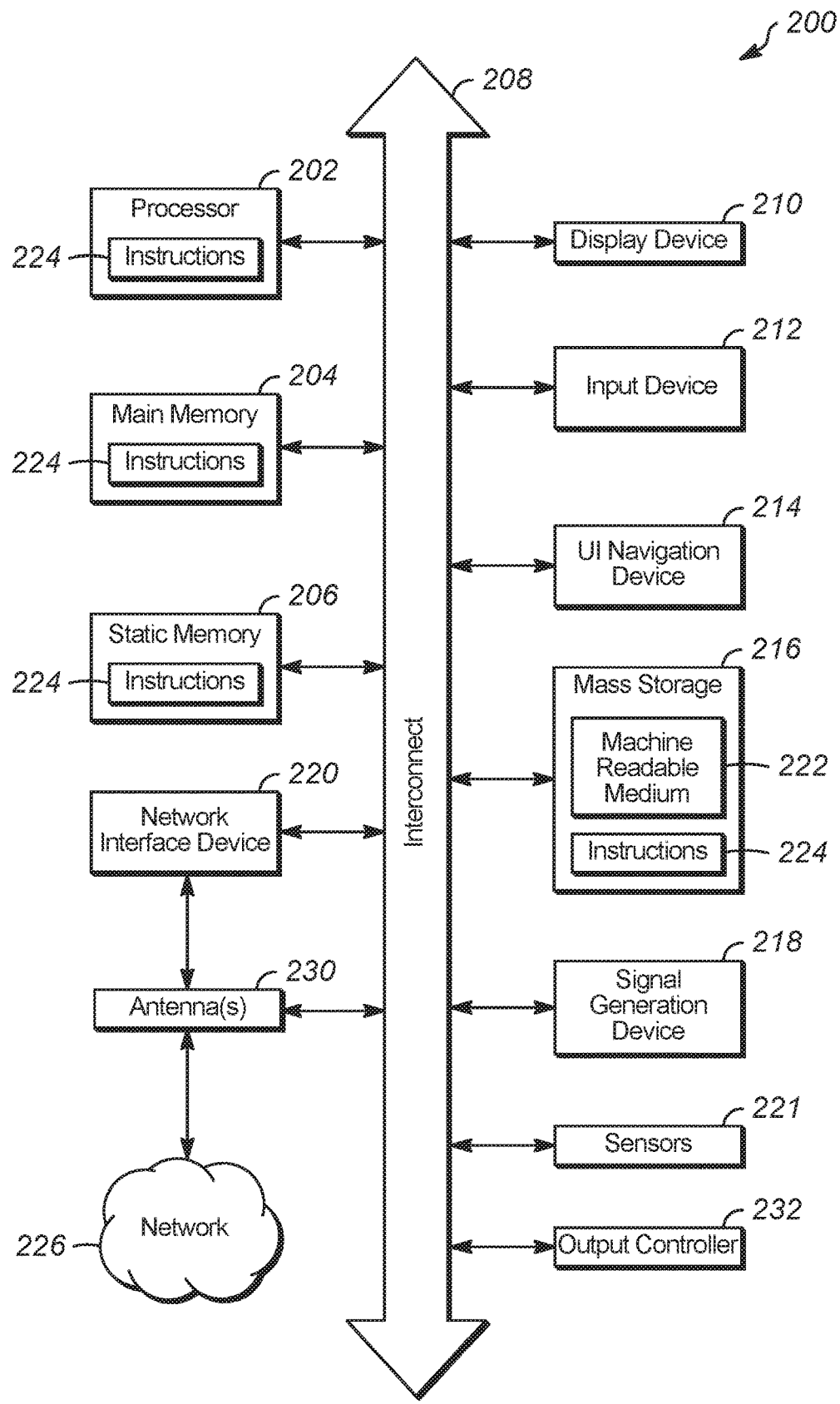
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
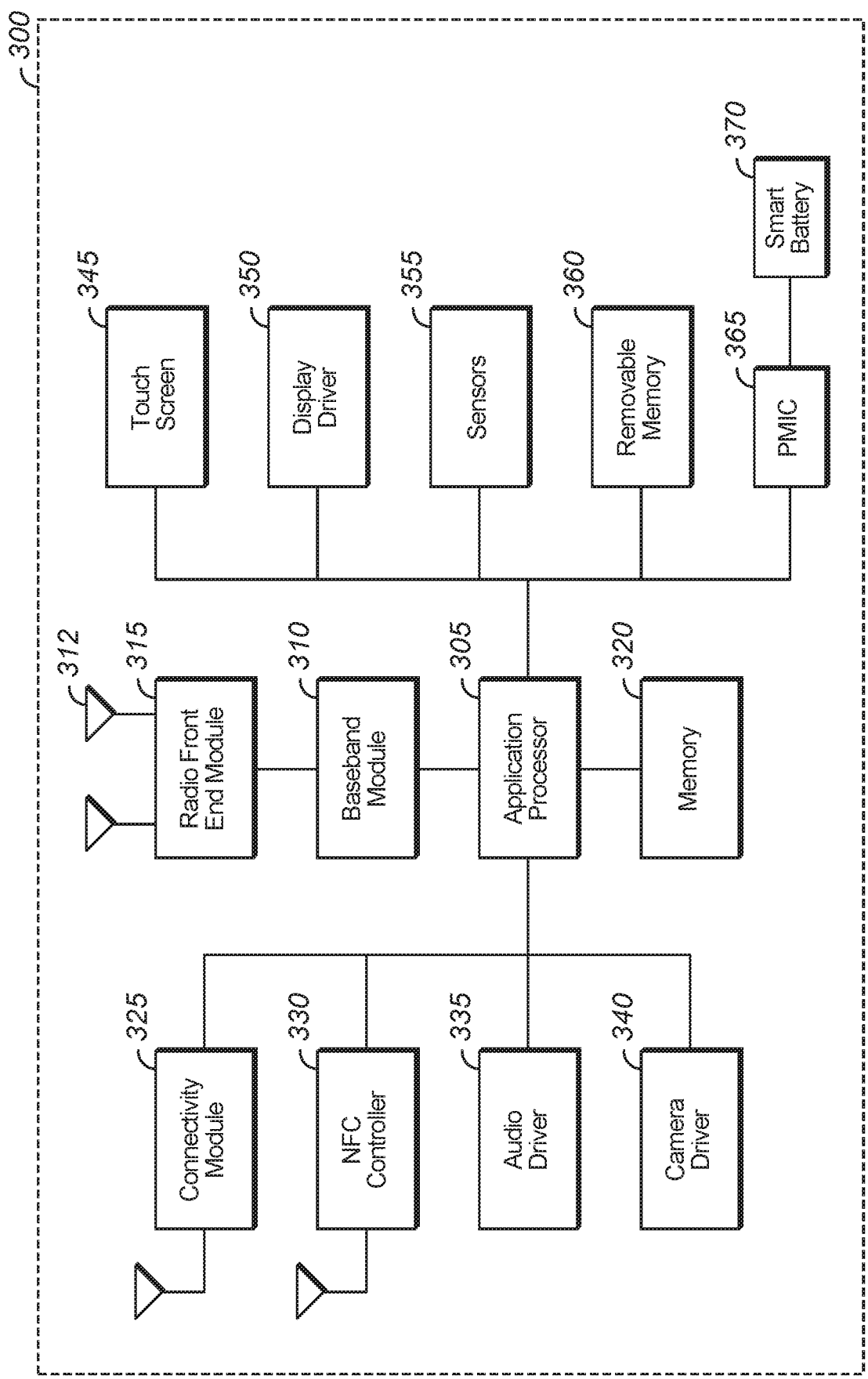
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
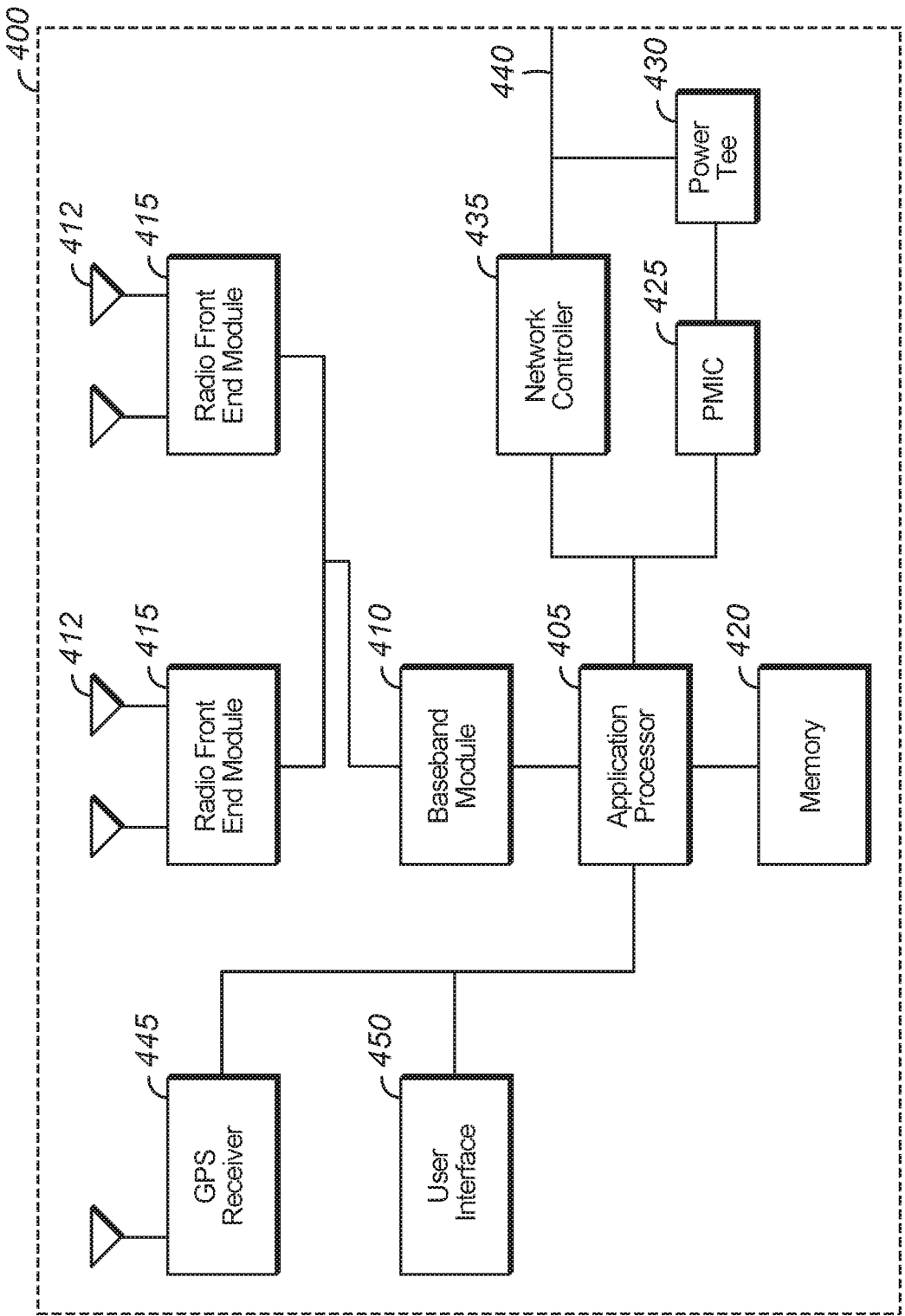
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with an aspect. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more or more of physical or virtual buttons, such as a reset button, one or more indicators such as light emitting diodes (LEDs) and a display screen.

Figure 5:
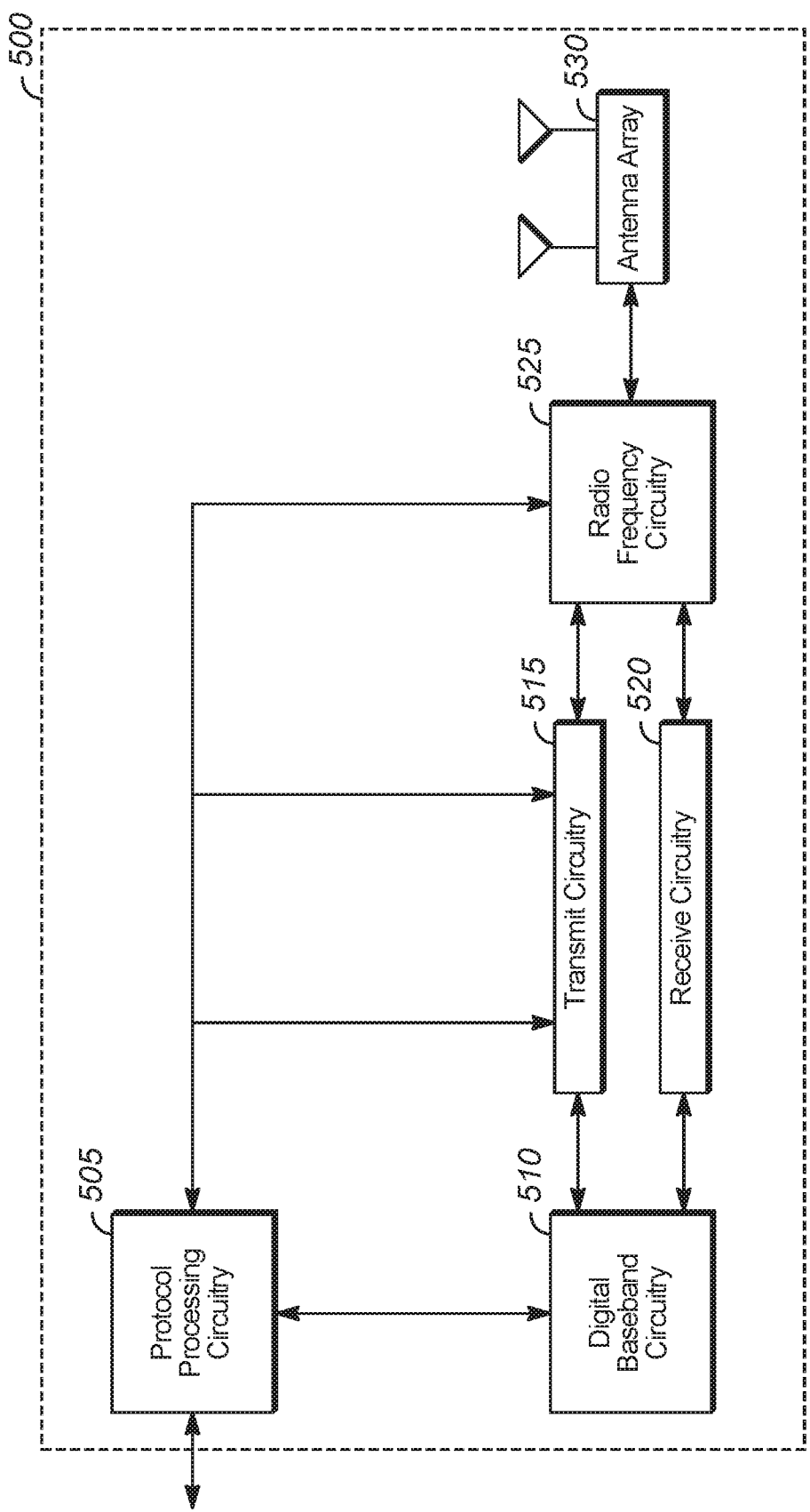
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions.

Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
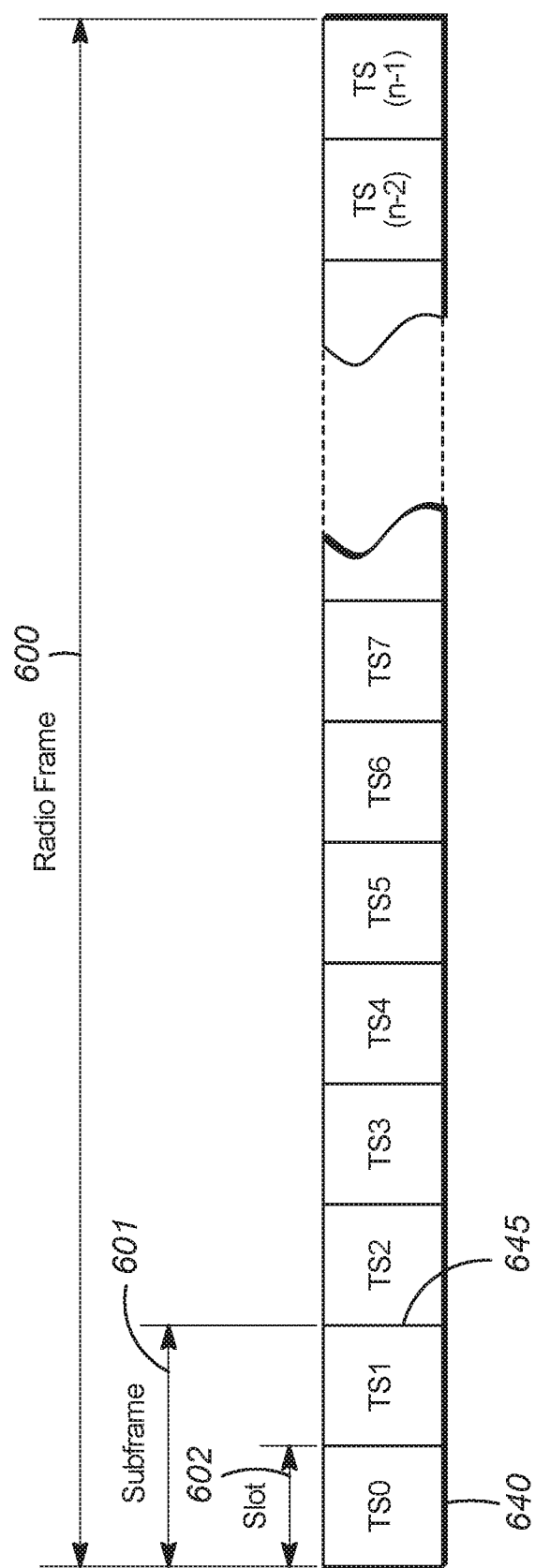
FIG. 6 illustrates an example of a radio frame structure in accordance with some embodiments.
Figure 7A:
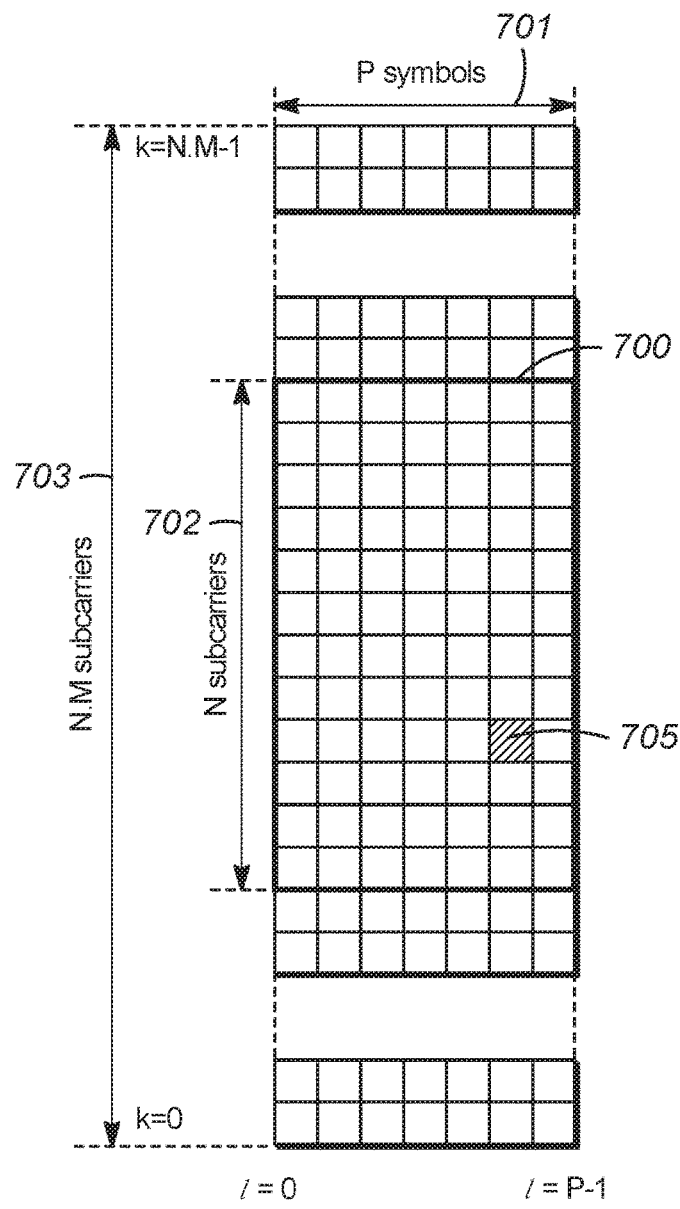
FIG. 7A and FIG. 7B illustrate example frequency resources in accordance with some embodiments.
Figure 7B:
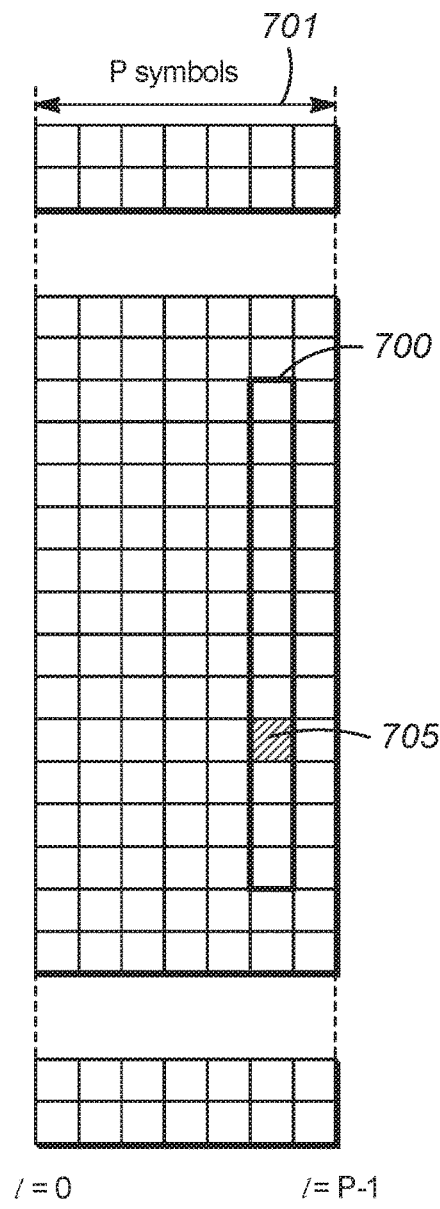

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information, sidelink control and data information. The combination of information types and direction may be selected independently for each subframe 602.

Referring to FIGS. 7A and 7B, in some aspects, a subcomponent of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, 1) where k is the index number of subcarrier, in the range 0 to N·M−1 (as indicated by 703), where N is the number of subcarriers in a resource block, and M is the number of resource blocks spanning a component carrier in the frequency domain.

In accordance with some embodiments, the eNB 104 may receive, from a UE 102, uplink control information (UCI) that indicates a hybrid automatic repeat request identifier (HARQ ID) for a grant-less uplink (GUL) transmission by the UE 102 during a first sub-frame. The eNB 104 may attempt to decode the GUL transmission. The eNB 104 may transmit, to the UE 102, downlink control information (DCI) that indicates the HARQ ID of the GUL transmission and further indicates whether the GUL transmission is successfully decoded. The eNB 104 may select, from candidate HARQ IDs, a HARQ ID for a scheduled uplink (SUL) transmission by another UE 102 in a second sub-frame after the first sub-frame. The eNB 104 may, if the GUL transmission is successfully decoded, include the HARQ ID for the GUL transmission in the candidate HARQ IDs for the SUL transmission. The eNB 104 may, if the GUL transmission is not successfully decoded, exclude the HARQ ID for the GUL transmission from the candidate HARQ IDs for the SUL transmission. These embodiments are described in more detail below.

Figure 8:
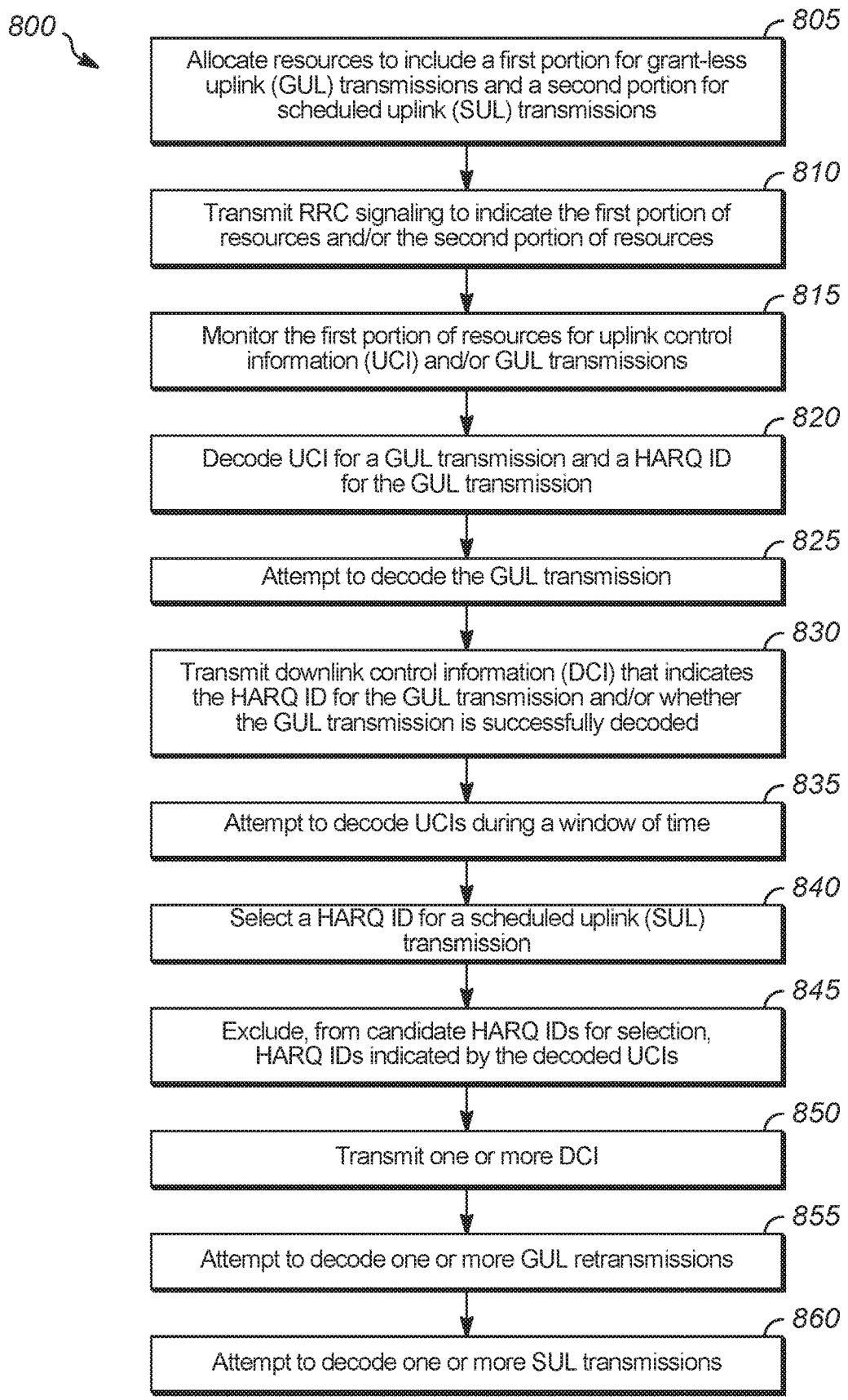
FIG. 8 illustrates the operation of a method of communication in accordance with some embodiments.
Figure 9:
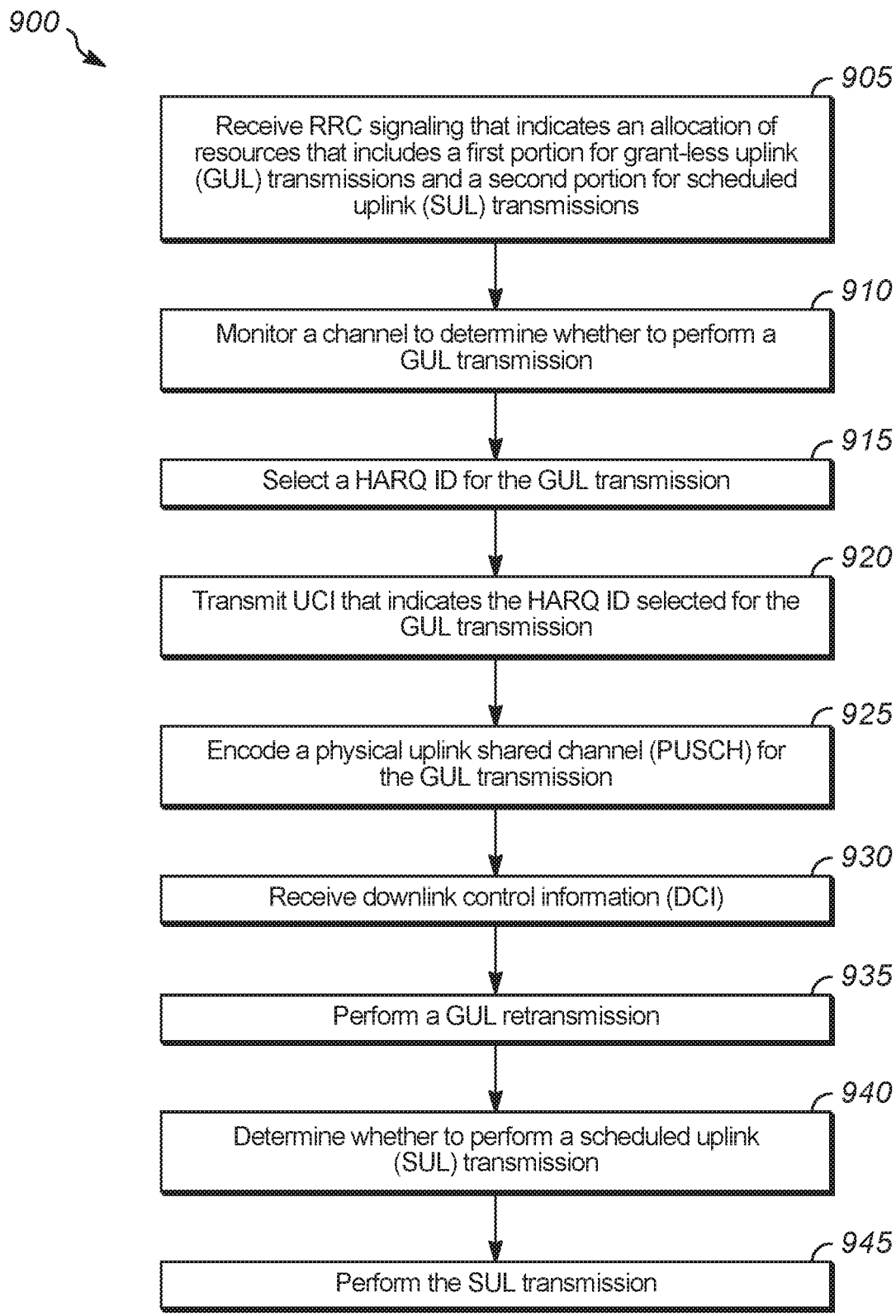
FIG. 9 illustrates the operation of another method of communication in accordance with some embodiments.

FIG. 8 illustrates the operation of a method of communication in accordance with some embodiments. FIG. 9 illustrates the operation of another method of communication in accordance with some embodiments. In describing the methods 800 and 900, reference may be made to one or more of FIGS. 1-12, although it is understood that the methods 800 and 900 may be practiced with any other suitable systems, interfaces and components. In some cases, descriptions herein of one or more of the concepts, operations and/or techniques regarding one of the methods described herein (800, 900 and/or other) may be applicable to at least one of the other methods described herein (800, 900 and/or other).

Some embodiments of the method 800 may include additional operations in comparison to what is illustrated in FIG. 8, including but not limited to operations described herein. Some embodiments of the method 800 may not necessarily include all of the operations shown in FIG. 8. In addition, embodiments of the method 800 are not necessarily limited to the chronological order that is shown in FIG. 8. In some embodiments, an eNB 104 may perform one or more operations of the method 800, but embodiments are not limited to performance of the method 800 and/or operations of it by the eNB 104. Accordingly, although references may be made to performance of one or more operations of the method 800 by the eNB 104 in descriptions herein, it is understood that the gNB 105 and/or UE 102 may perform one or more operations that may be the same as, similar to and/or reciprocal to one or more of the operations of the method 800, in some embodiments.

Some embodiments of the method 900 may include additional operations in comparison to what is illustrated in FIG. 9, including but not limited to operations described herein. Some embodiments of the method 900 may not necessarily include all of the operations shown in FIG. 9. In addition, embodiments of the method 900 are not necessarily limited to the chronological order that is shown in FIG. 9. In some embodiments, a UE 102 may perform one or more operations of the method 900, but embodiments are not limited to performance of the method 900 and/or operations of it by the UE 102. Accordingly, although references may be made to performance of one or more operations of the method 900 by the UE 102 in descriptions herein, it is understood that the eNB 104 and/or gNB 105 may perform one or more operations that may be the same as, similar to and/or reciprocal to one or more of the operations of the method 900, in some embodiments.

In some cases, operations and techniques described as part of the method 800 may be relevant to the method 900. In some cases, operations and techniques described as part of the method 900 may be relevant to the method 800. In addition, embodiments of the method 900 may include one or more operations that may be the same as, similar to or reciprocal to one or more of the method 800 (and/or other operation(s) described herein). For instance, an operation of the method 800 may include reception of an element (such as a frame, block, message and/or other) by the eNB 104 and the method 900 may include transmission of a same or similar element by the UE 102.

While the methods 800 and 900 and other methods described herein may refer to eNBs 104, gNBs 105 or UEs 102 operating in accordance with 3GPP standards, 5G standards, NR standards and/or other standards, embodiments of those methods are not limited to just those eNBs 104, gNBs 105 or UEs 102 and may also be practiced on other devices, such as a Wi-Fi access point (AP) or user station (STA). In addition, the methods 800, 900 and other methods described herein may be practiced by wireless devices configured to operate in other suitable types of wireless communication systems, including systems configured to operate according to various IEEE standards such as IEEE 802.11. The methods 800, 900 and other methods described herein may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the messages described herein may be included in a standard and/or radio-protocol, including but not limited to Third Generation Partnership Project (3GPP), 3GPP Long Term Evolution (LTE), Fourth Generation (4G), Fifth Generation (5G), New Radio (NR) and/or other. The scope of embodiments is not limited to usage of elements that are included in standards, however.

In some embodiments, the eNB 104 and/or UEs 102 may be arranged to operate in accordance with a license assisted access (LAA) arrangement.

In some embodiments, elements (including but not limited to those described herein) may be exchanged in a channel that is included in unlicensed spectrum. The channel may be configured for communication without an anchor carrier. The channel may be configured for communication in accordance with listen-before-talk (LBT) access techniques. In a non-limiting example, one or more operations, methods and/or techniques described herein may be performed in accordance with a MulteFire protocol.

In some embodiments, the eNB 104 and/or UEs 102 may be arranged to operate in accordance with an arrangement in which communication is performed in an unlicensed channel. In some embodiments, the eNB 104 and/or UEs 102 may be arranged to operate in accordance with an arrangement in which communication is performed in an unlicensed channel and an anchor channel may not necessarily be used. In some embodiments, the eNB 104 and/or UEs 102 may be arranged to operate in accordance with an arrangement in which communication is performed in an unlicensed channel and an anchor device (such as an eNB 104) may not necessarily be used.

At operation 805, the eNB 104 may allocate resources to include a first portion for grant-less uplink (GUL) transmissions and a second portion for scheduled uplink (SUL) transmissions. In some embodiments, the resources may include time resources, including but not limited to sub-frames, symbol periods and/or other time unit. In some embodiments, the resources may include frequency resources, including but not limited to resource blocks (RBs), physical resource blocks (PRBs), resource elements (REs), sub-channels, sub-carriers and/or other frequency unit. Embodiments are not limited to allocation of the resources by the eNB 104. In some embodiments, the resources may be pre-allocated, such as pre-allocation as part of a standard and/or protocol. In some embodiments, another component may allocate the resources.

In some embodiments, the resources may include contiguous frequency resources. In some embodiments, the resources may include non-contiguous frequency resources. In some embodiments, the resources may include contiguous time resources. In some embodiments, the resources may include non-contiguous time resources.

In some embodiments, the eNB 104 may allocate frequency resources to include at least: a first portion for GUL transmissions without scheduling grants from the eNB 104, and a second portion for SUL transmissions based on scheduling grants from the eNB 104.

It should be noted that descriptions herein of some operations and/or techniques may refer to PRBs and sub-frames, but such references are not limiting. In some embodiments, other time resources and/or frequency resources may be used in one or more of those operations and/or techniques.

It should be noted that some of the operations described herein may refer to two portions of resources (such as frequency resources and/or time resources) for GUL transmissions and SUL transmissions. However, it is understood that embodiments are not limited to arrangements in which resources are divided into two portions. In some embodiments, some or all of the resources may support both GUL transmissions and SUL transmissions. Accordingly, an operation described herein may refer to cases in which two portions are used. A similar operation may be used for arrangements in which some resources support both GUL transmissions and SUL transmissions. For instance, an operation described herein may refer to monitoring the first portion of the resources for GUL transmissions. A similar operation may include monitoring of resources for GUL transmissions, and some or all of those resources may support both GUL transmissions and SUL transmissions.

At operation 810, the eNB 104 may transmit radio resource control (RRC) signaling. In some embodiments, the eNB 104 may transmit the RRC signaling to the UE 102, although the scope of embodiments is not limited in this respect. In some embodiments, the RRC signaling may indicate information related to one or more of: frequency resources allocated for GUL transmissions, frequency resources allocated for SUL transmissions, time resources allocated for GUL transmissions, time resources allocated for SUL transmissions and/or other information. The RRC signaling may be included in a 3GPP standard, in some embodiments. It should be noted that embodiments are not limited to usage of the RRC signaling in this operation and/or other operations described herein, as any suitable messages may be used.

At operation 815, the eNB 104 may monitor the first portion of resources for uplink control information (UCI). In some embodiments, the eNB 104 may monitor the first portion for UCI from one or more UEs 102, although the scope of embodiments is not limited in this respect.

At operation 820, the eNB 104 may decode one or more UCIs. In some embodiments, the eNB 104 may receive the UCIs from one or more UEs 102, although the scope of embodiments is not limited in this respect. In some embodiments, the UCI may indicate a GUL transmission by a UE 102. In some embodiments, the UCI may indicate a HARQ ID for the GUL transmission. Embodiments are not limited to decoding of one UCI, however. In some embodiments, the eNB 104 may decode multiple UCI, including UCI from multiple UEs 102.

The UCI may be included in a 3GPP standard, in some embodiments. It should be noted that embodiments are not limited to usage of UCI in this operation and/or other operations described herein, as any suitable messages may be used.

At operation 825, the eNB 104 may attempt to decode the GUL transmission. In some embodiments, the eNB 104 may attempt to decode the GUL transmission from the UE 102, although the scope of embodiments is not limited in this respect.

At operation 830, the eNB 104 may transmit downlink control information (DCI). In some embodiments, the eNB 104 may transmit the DCI to the UE 102, although the scope of embodiments is not limited in this respect. In some embodiments, the DCI may indicate the HARQ ID for the GUL transmission. In some embodiments, the DCI may indicate whether the GUL transmission is successfully decoded. The DCI may be included in a 3GPP standard, in some embodiments. It should be noted that embodiments are not limited to usage of DCI in this operation and/or other operations described herein, as any suitable messages may be used.

At operation 835, the eNB 104 may attempt to decode UCIs received during a window of sub-frames prior to a sub-frame. In some embodiments, the eNB 104 may attempt to decode UCIs received from one or more UEs 102, although the scope of embodiments is not limited in this respect. The window may be of a predetermined size, although the scope of embodiments is not limited in this respect. In some embodiments, the decoded UCIs may indicate HARQ IDs for GUL transmissions.

At operation 840, the eNB 104 may select a HARQ ID for a scheduled uplink (SUL) transmission. In some cases, the SUL transmission may be an SUL transmission that is to be performed by another UE 102 (different from the UE 102 from which the eNB 104 attempts to decode the GUL transmission at operation 825). The scope of embodiments is not limited in this respect, however, as the eNB 104 may be configurable to select the HARQ ID at operation 840 for an SUL transmission by the same UE 102 from which the eNB 104 attempts to decode the GUL transmission at operation 825, in some embodiments.

In a non-limiting example, the eNB 104 may attempt to decode the GUL transmission in a first sub-frame, and may select the HARQ ID at operation 840 for an SUL transmission in a second sub-frame after the first sub-frame.

Different techniques for selection of the HARQ ID at operation 840 may be used. In a non-limiting example, the HARQ ID may be selected from candidate HARQ IDs. If the GUL transmission is successfully decoded at operation 825, the eNB 104 may include the HARQ ID (of the GUL transmission) in the candidate HARQ IDs for the SUL transmission. If the GUL transmission is not successfully decoded, the eNB 104 may exclude the HARQ ID from the candidate HARQ IDs for the SUL transmission.

In some embodiments, a shared pool of HARQ IDs for GUL transmissions and SUL transmissions may be used. In a non-limiting example, the candidate HARQ IDs may be included in the shared pool.

At operation 845, the eNB 104 may exclude, from candidate HARQ IDs for the selection at operation 840, HARQ IDs indicated by the decoded UCIs at operation 835.

At operation 850, the eNB 104 may transmit one or more DCI. In some embodiments, the eNB 104 may transmit the one or more DCI to the UE 102, although the scope of embodiments is not limited in this respect. For instance, the DCI may indicate one or more of the following: a GUL transmission, an SUL transmission, a GUL retransmission, an SUL retransmission and/or other. In some embodiments, the DCI may indicate information (such as an HARQ ID, resources and/or other) for the transmission and/or retransmission.

In a non-limiting example, the eNB 104 may transmit the DCI at operation 830 to indicate information related to the GUL transmission by the UE 102. The eNB 104 may transmit another DCI to indicate the SUL transmission. In some cases, the two DCI may be transmitted in a same subframe. In some cases, the two DCI may be transmitted in a different subframe.

In a non-limiting example, if a GUL transmission is not successfully decoded, the eNB 104 may encode the DCI to further include a scheduling grant for a GUL retransmission by the UE 102. The eNB 104 may, if the GUL transmission is not successfully decoded, attempt to decode the GUL retransmission by the UE 102. The eNB 104 may transmit another DCI that indicates the same HARQ ID of the GUL transmission and further indicates whether the GUL retransmission is successfully decoded.

In another non-limiting example, the eNB 104 may transmit DCI that indicates the SUL transmission by another UE 102 and/or the HARQ ID selected for the SUL transmission.

In another non-limiting example, the eNB 104 may transmit DCI that includes a bitmap to indicate which of the candidate HARQ IDs are available for GUL transmissions. In some embodiments, bit positions of the bitmap may correspond to the candidate HARQ IDs in accordance with a predetermined mapping.

In some embodiments, the eNB 104 may receive one or more UCI that indicate one or more GUL transmissions and corresponding HARQ IDs. The eNB 104 may attempt to decode the GUL transmissions. The eNB 104 may determine, from candidate HARQ IDs, one or more available HARQ IDs for an SUL transmission. The available HARQ IDs may include the candidate HARQ IDs that are not indicated by the UCIs. The available HARQ IDs may include the HARQ IDs that correspond to GUL transmissions that are decoded. The available HARQ IDs may exclude the HARQ IDs that correspond to GUL transmissions that are not decoded.

In some embodiments, the eNB 104 may select, from the available HARQ IDs, an HARQ ID for the SUL transmission. The eNB 104 may encode, for transmission, DCI that indicates: the SUL transmission, the selected HARQ ID and/or other.

At operation 855, the eNB 104 may attempt to decode one or more GUL retransmissions. In some embodiments, the eNB 104 may attempt to decode one or more GUL retransmissions received from one or more UEs 102, although the scope of embodiments is not limited in this respect.

At operation 860, the eNB 104 may attempt to decode one or more SUL retransmissions. In some embodiments, the eNB 104 may attempt to decode one or more SUL transmissions from one or more UEs 102, although the scope of embodiments is not limited in this respect.

In some embodiments, an apparatus of an eNB 104 may comprise memory. The memory may be configurable to store information identifying the HARQ ID of the GUL transmission. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to decoding of the UCI. The apparatus may include a transceiver to receive the UCI. The transceiver may transmit and/or receive other blocks, messages and/or other elements.

At operation 905, the UE 102 may receive RRC signaling that indicates an allocation of resources that includes a first portion for grant-less uplink (GUL) transmissions and a second portion for scheduled uplink (SUL) transmission. In some embodiments, the UE 102 may receive the RRC signaling from the eNB 104, although the scope of embodiments is not limited in this respect.

At operation 910, the UE 102 may monitor a channel to determine whether to perform a GUL transmission. In some embodiments, the UE 102 may attempt to detect other transmissions, including but not limited to: GUL transmissions (and/or retransmissions) from other UEs 102, SUL transmissions and/or retransmissions) from other UEs 102; and/or other. In some embodiments, the UE 102 may monitor the channel as part of a listen-before-talk (LBT) technique. In some embodiments, the UE 102 may monitor the channel during a time period (such as a time window that occurs before the GUL transmission is to be performed) to determine whether to perform the GUL transmission.

In some embodiments, the channel may be included in unlicensed spectrum. In some embodiments, the channel may be configured for communication without an anchor carrier. In some embodiments, the channel may be configured for communication without an anchor component (such as an anchor eNB 104). In some embodiments, the UE 102 may be arranged to operate in accordance with an LAA technique. In some embodiments, the UE 102 may be arranged to operate in accordance with a MulteFire protocol/technique.

At operation 915, the UE 102 may select a HARQ ID for the GUL transmission. In some embodiments, one or more techniques described herein for selection of the HARQ ID may be used, although the scope of embodiments is not limited in this respect.

At operation 920, the UE 102 may transmit UCI that indicates the HARQ ID selected for the GUL transmission. In some embodiments, the UE 102 may transmit the UCI to the eNB 104, although the scope of embodiments is not limited in this respect.

At operation 925, the UE 102 may encode a physical uplink shared channel (PUSCH) for the GUL transmission. In some embodiments, the UE 102 may transmit the PUSCH to the eNB 104, although the scope of embodiments is not limited in this respect. The PUSCH may be included in a 3GPP standard, in some embodiments. It should be noted that embodiments are not limited to usage of PUSCH in this operation and/or other operations described herein, as any suitable messages may be used. For instance, a block of data bits may be encoded and/or processed otherwise to generate any element, and that element may be transmitted by the UE 102.

At operation 930, the UE 102 may attempt to decode one or more DCI. In some embodiments, the UE 102 may receive the DCI from the eNB 104, although the scope of embodiments is not limited in this respect. In some embodiments, if none of the decoded DCIs indicates an SUL transmission by the UE 102, the UE 102 may select, from candidate HARQ IDs, a HARQ ID for the GUL transmission.

In some embodiments, if one of the decoded DCIs indicates an SUL, transmission by the UE 102, the UE 102 may determine the HARQ ID for the GUL transmission as a HARQ ID that is assigned for the SUL transmission in the DCI. For instance, the HARQ ID indicated for the SUL transmission in the DCI may instead be used for the GUL transmission. In addition, if one of the decoded DCIs indicates the SUL transmission by the UE 102, the UE 102 may refrain from performance of the SUL transmission, in some embodiments.

At operation 935, the UE 102 may perform a GUL transmission. At operation 940, the UE 102 may determine whether to perform an SUL transmission. At operation 945, the UE 102 may perform the SUL transmission.

In some embodiments, an apparatus of a UE 102 may comprise memory. The memory may be configurable to store information identifying the HARQ ID of the GUL transmission. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to decoding of the DCI. The apparatus may include a transceiver to receive the DCI. The transceiver may transmit and/or receive other blocks, messages and/or other elements.

Figure 10:
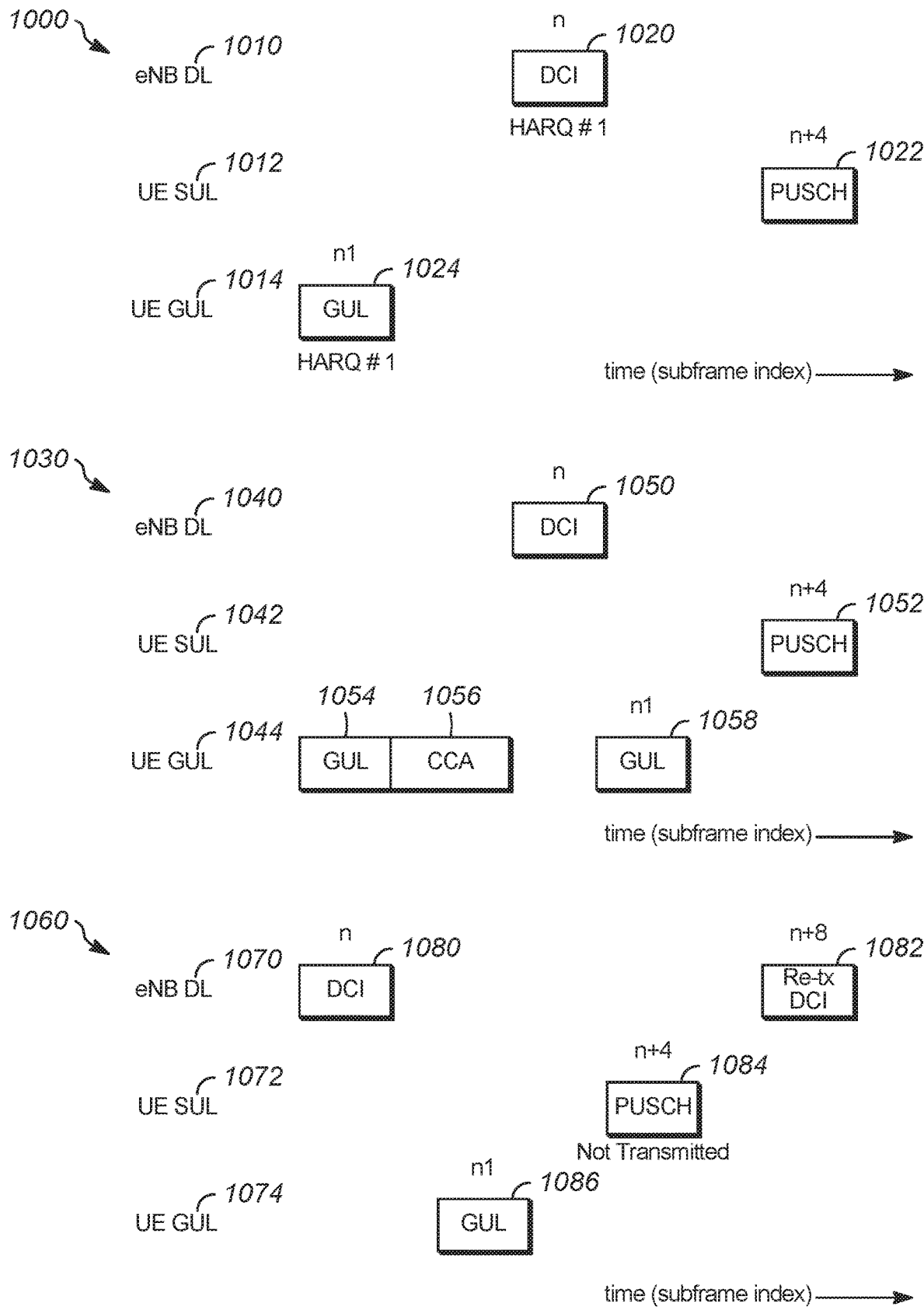
FIG. 10 illustrates example scenarios of uplink transmission and scheduling in accordance with some embodiments.
Figure 11:
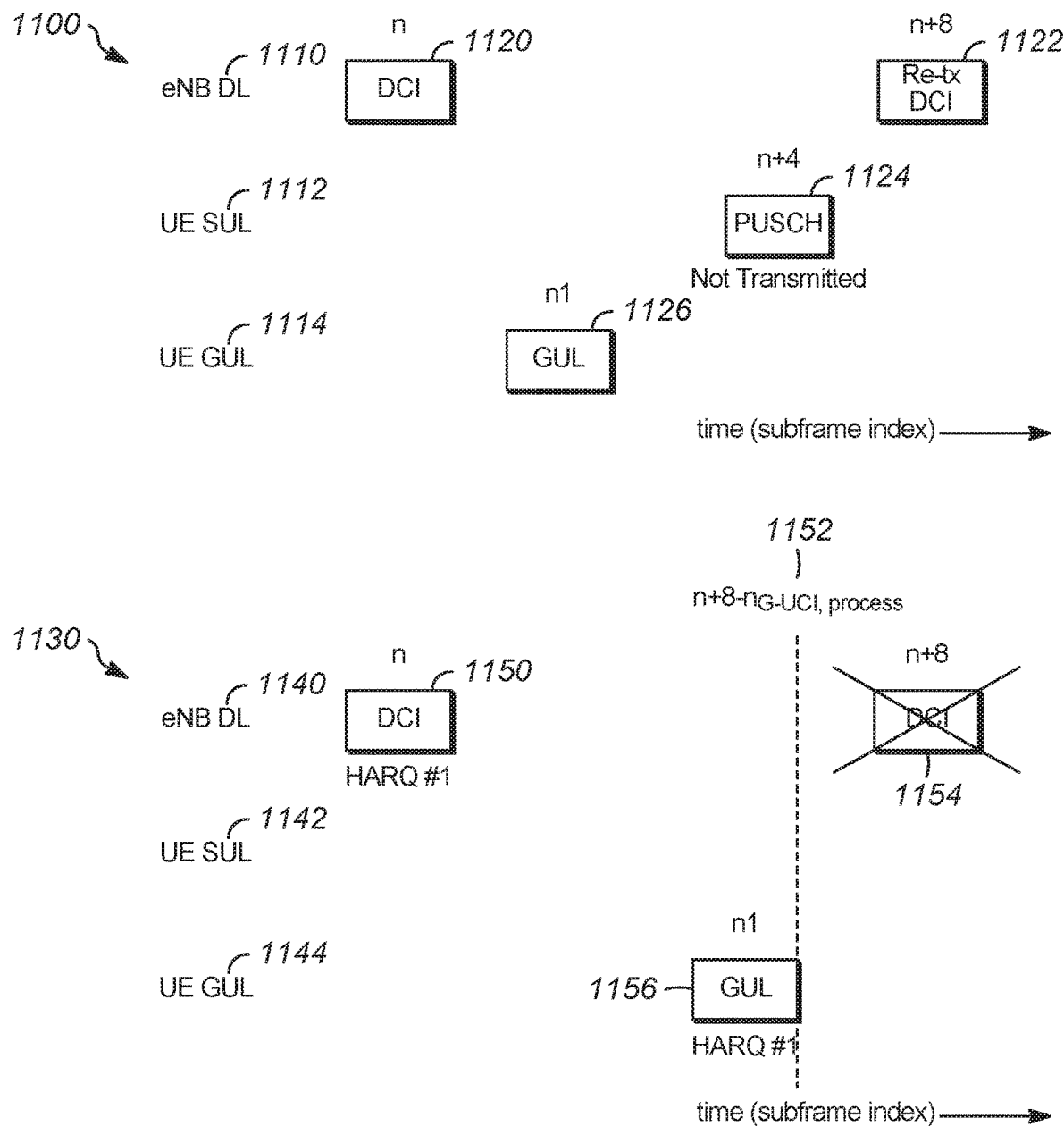
FIG. 11 illustrates additional example scenarios of uplink transmission and scheduling in accordance with some embodiments.
Figure 12:
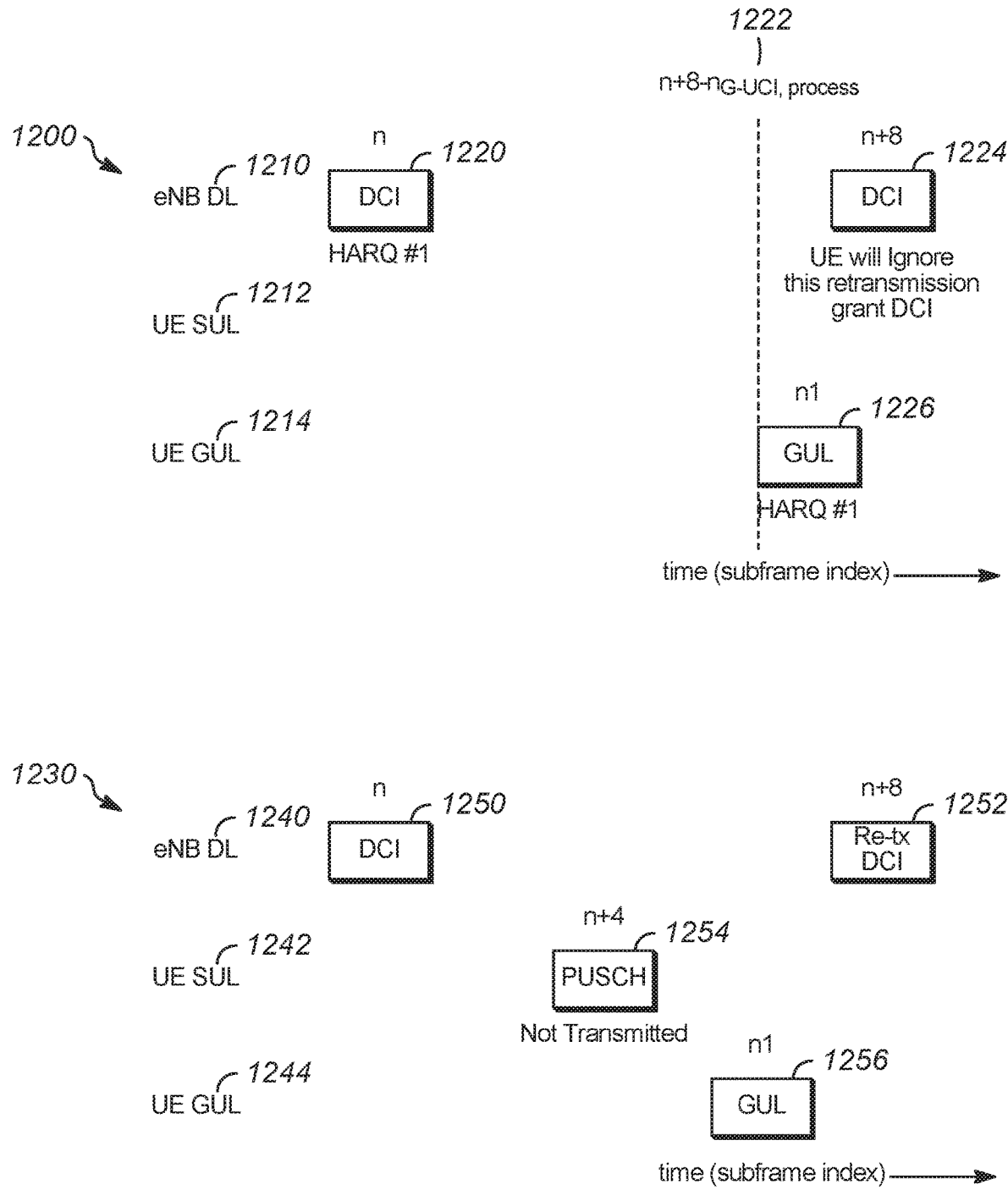
FIG. 12 illustrates additional example scenarios of uplink transmission and scheduling in accordance with some embodiments.

FIG. 10 illustrates example scenarios of uplink transmission and scheduling in accordance with some embodiments. FIG. 11 illustrates additional example scenarios of uplink transmission and scheduling in accordance with some embodiments. FIG. 12 illustrates additional example scenarios of uplink transmission and scheduling in accordance with some embodiments. It should be noted that the examples shown in FIGS. 10-12 may illustrate some or all of the concepts and techniques described herein in some cases, but embodiments are not limited by the examples. For instance, embodiments are not limited by the name, number, type, size, ordering, arrangement and/or other aspects of the operations, messages, elements, signaling, eNBs 104, UEs 102, sub-frames, time resources, RBs, frequency resources and other elements as shown in FIGS. 10-12. Although some of the elements shown in the examples of FIGS. 10-12 may be included in a 3GPP LTE standard, 5G standard, NR standard and/or other standard, embodiments are not limited to usage of such elements that are included in standards.

In some embodiments, devices may operate in unlicensed spectrum in accordance with an LTE protocol and/or a Licensed-Assisted Access (LAA) technique. Embodiments are not limited to usage of LTE protocols, as other protocol may be used, in some embodiments. Embodiments are also not limited to usage of LAA techniques, as other techniques for usage of unlicensed spectrum may be used, in some embodiments. Example scenarios of LTE operation in unlicensed spectrum include, but are not limited to: LTE operation in the unlicensed spectrum via dual connectivity (DC); operation of a standalone LTE system in the unlicensed spectrum; operation of a standalone LTE system in the unlicensed spectrum without usage of an "anchor" in licensed spectrum; MulteFire; and/or other.

In some embodiments, grant-less uplink (GUL) transmission may be used. In a non-limiting example, one HARQ ID may correspond to one PUSCH subframe. Then one or more techniques for division of the HARQ IDs between GUL operation and scheduled uplink (SUL) operation may be used. In some embodiments, GUL may be initialized by the UE 102. In a non-limiting example scenario, if one of the HARQ IDs is utilized by the UE 102, and the eNB 104 may fail to determine this (such as through detection of a UCI and/or other technique(s)). It may be possible, in some cases, that the eNB 104 may configure the same HARQ ID to SUL operation. This may create ambiguity and/or confusion, in some cases. In another non-limiting example scenario, the eNB 104 may configure one of the HARQ IDs for SUL, and the UE 102 may fail to determine this (such as through detection of a DCI and/or other technique(s)). It may be possible, in some cases, that the UE may use the same HARQ ID for GUL transmission. This may create ambiguity and/or confusion, in some cases.

In a non-limiting example, for semi-persistent scheduling (SPS), a HARQ ID may be determined based on an equation such as the one below. It should be noted that other equations, similar equations and/or other techniques may be used to determine and/or indicate the HARQ ID.

HARQ Process ID=[floor(CURRENT_TTI/semiPersistSchedIntervalUL)]modulo(numberOfConfUlSPS-Processes)

In the above, the parameters numberOfConfUlSPS-Processes and semiPersistSchedIntervalUL may be configured by eNB 104 through higher layer signaling, although the scope of embodiments is not limited in this respect. Accordingly, both the UE 102 and the eNB 104 may both determine and/or know which HARQ ID is used for the SPS transmission(s).

In some embodiments, HARQ IDs for GUL and SUL may be separately configured. For instance, one or more HARQ IDs may be configured for GUL and one or more HARQ IDs may be configured for SUL. In a non-limiting example, RRC signaling and/or other signaling may be used.

In some embodiments, a bitmap may be used to indicate which HARQ IDs are to be used for GUL, which HARQ IDs are to be used for GUL and/or other information. Any suitable size may be used for the bitmap, including but not limited to 16 bits. In a non-limiting example, bit positions of the bitmap may be assigned, allocated and/or mapped to HARQ IDs. A value (such as "1") in a bit position of the bitmap may indicate that the corresponding HARQ ID is used for GUL. A value (such as "0") in the bit position may indicate that the corresponding HARQ ID is used for SUL. Embodiments are not limited to the example usage of the values 0 and 1 described above.

In some embodiments, the eNB 104 may configure a number of HARQ IDs for GUL transmission. In a non-limiting example, 16 HARQ IDs may be used. If N of the HARQ IDs are configured for GUL transmission, the lowest N HARQ IDs may be used for GUL transmission (such as 0, 1 . . . N−1). In addition, other HARQ IDs (such as 16, 16−1 . . . 16−N+1) may be used for SUL transmission.

In some embodiments, a starting/ending index for GUL may be used. If the starting index is used, the HARQ IDs, starting from the HARQ ID indicated by the starting index to the maximum HARQ ID may be utilized for GUL transmission. If the ending index is used, the HARQ IDs between 0 and the HARQ ID indicated by the ending index may be used for GUL transmission.

In some embodiments, a GUL activation/deactivation DCI may be utilized to configure the HARQ IDs for GUL. The scope of embodiments is not limited to usage of this particular element to configure the HARQ IDs for GUL, however. In some embodiments, one or more of the techniques described herein (such as a bitmap, a number of HARQ IDs for GUL, a starting/ending index and/or other) may be included in the GUL activation/deactivation DCI.

In some embodiments, HARQ IDs for GUL and SUL may be separately configured. In some embodiments, the HARQ ID (which may be in a range such as 0 through 15 and/or other range, in some cases) may be scheduled by the eNB 104 via grant DCI. The UE 102 may use information in the SUL grant to perform the SUL transmission. For a retransmission, the eNB 104 may schedule the corresponding SUL retransmission grant.

In some embodiments, the GUL may be transmitted by the UE 102, and one of the HARQ IDs of a range (such as 0 to 15 and/or other range) may be randomly selected by the UE 102. The eNB 104 may feedback HARQ information (such as HARQ bits, HARQ indicators and/or other) through a G-DCI, which may include the HARQ of GUL. For a GUL that is NACKed, the UE 102 may perform a retransmission for the GUL or may perform a retransmission using resources scheduled by the eNB 104. In order to enable a component (such as the UE 102 and/or other) to distinguish retransmission grant of GUL and SUL, an RNTI different from C-RNTI may be used. For instance, a DCI for SUL retransmission may be based on the C-RNTI, and a DCI for GUL retransmission may be based on the other RNTI (the RNTI different from C-RNTI, as described above). In some embodiments, a bit field length of G-DCI may be the same as a bit field length of C-RNTI, while one bit flag may be used to distinguish the HARQ feedback, and retransmission grant.

In some embodiments, one or more HARQ IDs for GUL and SUL may be shared. This may depend on which type of access (GUL or SUL) was attempted first, in some cases, although the scope of embodiments is not limited in this respect.

In some embodiments, a HARQ ID for an initial GUL transmission may be determined by the UE 102. In some embodiments, the determined HARQ ID may be sent by the UE 102 (to the eNB 104 and/or other component) in a G-UCI and/or other element.

In some embodiments, a bitmap of G-DCI may include a bitmap for HARQ IDs (including but not limited to the HARQ IDs used for GUL and/or SUL). Usage of the bitmap may be considered as a reset of HARQ process IDs, in some cases, although the scope of embodiments is not limited in this respect. In some embodiments, for the ACKed HARQ IDs, GUL and SUL may be shared for initial transmission, while for the NACKed HARQ IDs, the transmission mode may be maintained.

In some embodiments, the eNB 104 may use an HARQ ID for an SUL initial transmission at subframe n, if it has not detect a GUL with that HARQ ID before (n−$N_{UCI,process}$), where $N_{UCI,process}$ is a process delay for G-UCI decoding. In a non-limiting example, may be equal to one $N_{UCI,process}$.

In some embodiments, the eNB 104 may refrain from transmission of a grant DCI at subframe n with an HARQ ID if the eNB 104 detects a GUL with that HARQ ID before $(n-N_{UCI,process})$ subframe.

In some embodiments, if the UE 102 prepares to transmit GUL at subframe n1 with an HARQ ID, and the UE 102 decodes a DCI with the same HARQ ID at subframe n, one or more of the following may be performed. If n<n1, the GUL may be dropped, and the UE 102 may perform SUL according to the grant information (of the DCI). If $(n+N_{UCI,process})>=n1>n$ (wherein $N_{UCI,process}$ is a process delay for UCI detection), the UE 102 may ignore the DCI and may refrain from transmission of PUSCH according to the DCI grant. If $(n+N_{PUSCH,process})>=n1>(n+N_{UCI,process})$: for an initial transmission, the UE 102 may perform the SUL according to the DCI grant; and for a retransmission, the UE 102 may ignore the grant and/or refrain from transmission of the PUSCH. If $n>(n1+N_{PUSCH,process})$ and if the DCI schedules an initial transmission, the UE 102 may perform the SUL according to the DCI grant. If the DCI schedules a retransmission, and a transport block size (TBS) of grant retransmission is the same as a TBS of the GUL, the UE 102 may perform the GUL retransmission. If the TBSs described above are different, the UE 102 may ignore the grant and may refrain from transmission.

In some embodiments, when the eNB 104 schedules an initial SUL transmission, the eNB 104 may use one or more HARQ IDs that are not assigned for GUL. After G-DCI transmission, the eNB 104 may use the ACKed GUL HARQ IDs for the initial SUL transmission. The DCI to schedule the initial SUL transmission may be sent in the same subframe as G-DCI transmission, although the scope of embodiments is not limited in this respect. Otherwise, the UE 102 may prepare a GUL transmission based on the ACKed GUL HARQ IDs.

In some embodiments, when the eNB 104 schedules a retransmission, if the DCI schedules the ACKed GUL HARQ ID for SUL initial transmission in the same subframe as G-DCI, the UE 102 may perform the SUL according to DCI. Otherwise, the DCI grant may be ignored. When the DCI schedules the retransmission of NACKed GUL HARQ IDs, if the TBS is the same as a TBS of the GUL transmission, the UE 102 may perform the retransmission as indicated by the DCI. Otherwise, the DCI and/or the PUSCH resource may be ignored.

Referring to FIG. 10, in the example scenario 1000, the initial GUL 1024 is transmitted by the UE 102 in subframe n1, which is earlier than a transmission of the DCI 1020 by the eNB 104 in subframe n. When the subframe gap, $(n-n1)<N_{pusch,process}$ (wherein $N_{pusch,process}$ is the process delay for PUSCH decoding, which may be equal to 4 sub-frames or other value), regardless of whether the UE 102 correctly decodes the DCI 1020, the UE 102 may ignore the DCI grant. If the GUL 1024 is missed (and/or not decoded) by the eNB 104, the eNB 104 may not be able to receive SUL and GUL, in some cases. When $(n-n1)>=N_{pusch,process}$, the eNB 104 may transmit the DCI 1020 for GUL retransmission or initial SUL transmission. In some cases, this may depend on the transmission stage. In some embodiments, this operation may be performed by the eNB 104 based on different possible implementations.

In some embodiments, if the GUL 1024 is ACKed, a G-DCI (such as 1020 and/or other) may feedback an ACK for the GUL 1024. The eNB 104 may schedule an SUL initial transmission with a HARQ ID of the GUL 1024. In some embodiments, if the GUL 1024 is missed (and/or not decoded) by the eNB 104, the G-DCI may feedback a NACK and the eNB 104 may schedule an SUL initial transmission with the HARQ ID of the GUL 1024. In some embodiments, if the GUL 1024 is NACKed, the G-DCI may feedback a NACK and the eNB 104 may refrain from scheduling the initial SUL transmission with that HARQ ID. In some embodiments, the UE 102 may perform a transmission indicated by the grant (such as in the G-DCI).

Referring to FIG. 10, in the example scenario 1030, the initial GUL 1058 is transmitted by the UE 102 in subframe n1, which is later than the transmission of the DCI 1050 by the eNB 104 in subframe n, and is earlier than the PUSCH 1052 (which corresponds to DCI 1050) transmitted by the UE 102 in subframe n+4. In one option, if the DCI 1050 includes a retransmission grant, the GUL subframe may be reserved, and the retransmission may be performed according to the scheduled grant. For the GUL transmission 1058, the UE 102 may refrain from usage of a HARQ ID that is configured for the PUSCH 1052. In another option, if the DCI 1050 is for an initial SUL transmission, the UE 102 may perform one or more of: use, for the GUL transmission 1058, a HARQ ID configured for the SUL transmission; ignore the grant of the DCI 1050. In some cases, the GUL subframe with that HARQ ID can either overlap or not overlap with the SUL subframe. In another option, regardless of whether the DCI 1050 is for a new transmission or retransmission, the UE 102 may refrain from usage, for the GUL transmission 1058, of a HARQ ID configured for the new transmission or retransmission. The UE 102 may perform the GUL transmission 1058 based on a remaining HARQ ID (such as one that has not been allocated/configured for another element), and may transmit on the SUL based on the grant with the assigned HARQ ID.

Referring to FIG. 10, in scenario 1060, if the GUL transmission 1086 is decoded by the eNB 104, the eNB 104 may refrain from transmission of a grant for subframe n+8, and may use the HARQ ID of the GUL 1086 for GUL retransmissions) for NACKed GUL(s). The eNB 104 may schedule new transmissions with that HARQ ID for ACKed GUL(s).

Referring to FIG. 11, in scenario 1100, if the DCI 1120 is missed (and/or not decoded) by the UE 102, the GUL 1126 may use a same HARQ ID that corresponds to a grant in the DCI 1120. If the GUL 1126 is missed (and/or not decoded) by the eNB 104, the eNB 104 may send the retransmission PUSCH grant DCI 1122. In one option, the UE 102 may perform a GUL retransmission based on the Re-tx DCI 1122. In another option, the retransmission grant DCI for GUL 1122 may be differentiated as the retransmission grant for SUL. For a retransmission grant, a 2-bit length Cat.4 priority field and/or other element may be used. For instance, a value of "00" may indicate SUL retransmission, and a value of "01" may indicate GUL retransmission. The Cat.4 priority may reuse the priority of initial transmission, in some embodiments. In addition, one or more of the following may be used to differentiate retransmission for GUL and SUL: a 2-bits field "PUSCH starting position", 1-bit "LBT type", 1-bit "Ending gap", 1-bits field "2-stage indication" and/or other. Embodiments are not limited to the type, size, name and/or other aspects of those elements. In some embodiments, one or more of those fields may be used for other purposes, such as to indicate any suitable information related to GUL transmission, GUL retransmission, SUL transmission, SUL retransmission and/or other. In some embodiments, if the UE 102 detects that the Re-Tx DCI 1122 is for SUL, then the UE 102 may refrain from usage of a corresponding HARQ ID (such as a HARQ ID indicated by the Re-TX DCI 1122) for initial GUL transmission. In a non-limiting example, the UE 102 may reuse the HARQ ID after the UE 102 detects that maximum retransmission is achieved, or if an ACK is received.

In another option, if the UE 102 detects that a TBS indicated by a grant of the Re-tx DCI 1122 does not match a TBS of the GUL 1126, the UE 102 may ignore the Re-TX DCI 1122 and/or may refrain from transmission(s) indicated by the Re-TX DCI 1122.

In some cases, the GUL transmission may be performed between a PUSCH and a retransmission DCI grant. If the UE 102 decoded the DCI, then the GUL may refrain from usage of a HARQ ID that corresponds to the retransmission DCI grant. In one option, if the DCI is not decoded by the UE 102 and the GUL is decoded by the eNB 104, if the GUL is detected before a subframe of index equal to $(n+8-n_{G-UCI,process})$, wherein $n_{G-UCI,process}$ is a processing delay for G-UCI detection (for example, the value may be equal to one subframe or other value), the SUL retransmission grant in a subframe of index equal to (n+8) may be abandoned. Referring to the example scenario 1130 in FIG. 11, the DCI 1854 may be abandoned and/or ignored. For instance, the UE 102 may refrain from a transmission indicated by the DCI 1854.

In another option, if the GUL is successfully detected after a subframe of index equal to $(n+8-n_{G-UCI,process})$, wherein $n_{G-UCI,process}$ is a processing delay for G-UCI detection (which may take a value of one or other value), the SUL retransmission grant at (n+8) may be transmitted, since the eNB 104 may not necessarily know information about the GUL. If a subframe gap between GUL and retransmission grant is smaller than $N_{pusch,process}$, wherein $N_{pusch,process}$ is a processing delay for PUSCH decoding (which may be equal to a value of 4 or other value), the UE 102 may ignore this retransmission grant. If the $n_{G-UCI,process}$ is smaller than $N_{pusch,process}$, cases in which the retransmission SUL DCI is transmitted after $(n1+n_{G-UCI,process})$ may not necessarily occur. This is illustrated in FIG. 12, in which the GUL 1226 may be successfully decoded by the eNB 104, and the UE 102 may ignore a retransmission grant of the DCI 1224.

In some cases, an initial DCI grant may be missed (and/or not decoded) by the UE 102 and the GUL may be missed (and/or not decoded) by the eNB 104. For instance, in scenario 1230 in FIG. 12, the UE 102 may miss (and/or not decode) DCI 1250 and the eNB 104 may miss (and/or not decode) GUL 1256. When (n+8−n1)<4, the UE 102 may determine that a HARQ ID has been used by the eNB 104, and may refrain from usage of it for GUL retransmission. When (n+8−n1)>=4, one or more options are possible. In one option, the UE 102 may perform a GUL retransmission based on the Re-tx DCI 1252. In another option, the retransmission grant DCI for GUL 1256 may be differentiated as the retransmission grant for SUL. Previously described techniques and/or fields may be used, although the scope of embodiments is not limited in this respect. In another option, if the UE 102 detects that a TBS indicated by a grant of the Re-tx DCI 1252 does not match a TBS of the GUL 1256, the UE 102 may ignore the Re-TX DCI 1252 and/or may refrain from transmission(s) indicated by the Re-TX DCI 1252.

In Example 1, an apparatus of an Evolved Node-B (eNB) may comprise memory. The apparatus may further comprise processing circuitry. The processing circuitry may be configured to decode, from a User Equipment (UE), uplink control information (UCI) that indicates a hybrid automatic repeat request identifier (HARQ ID) for a grant-less uplink (GUL) transmission by the UE during a first sub-frame. The processing circuitry may be further configured to attempt to decode the GUL transmission. The processing circuitry may be further configured to encode, for transmission to the UE, downlink control information (DCI) that indicates the HARQ ID of the GUL transmission and further indicates whether the GUL transmission is successfully decoded. The processing circuitry may be further configured to select, from candidate HARQ IDs, a HARQ ID for a scheduled uplink (SUL) transmission by another UE in a second sub-frame after the first sub-frame, wherein: if the GUL transmission is successfully decoded, the processing circuitry is configured to include the HARQ ID for the GUL transmission in the candidate HARQ IDs for the SUL transmission; and if the GUL transmission is not successfully decoded, the processing circuitry is configured to exclude the HARQ ID for the GUL transmission from the candidate HARQ IDs for the SUL transmission. The memory may be configured to store information identifying the HARQ ID of the GUL transmission.

In Example 2, the subject matter of Example 1, wherein the processing circuitry may be further configured to attempt to decode UCIs received during a window of sub-frames prior to the first sub-frame, wherein the window is of a predetermined size. The processing circuitry may be further configured to exclude, from the candidate HARQ IDs for the selection of the SUL transmission by the other UE in the second sub-frame, HARQ IDs of GUL transmissions that are indicated by the decoded UCIs received during the window of sub-frames.

In Example 3, the subject matter of one or any combination of Examples 1-2, wherein the processing circuitry may be further configured to allocate frequency resources to include: a first portion for GUL transmissions without scheduling grants from the eNB, and a second portion for SUL transmissions based on scheduling grants from the eNB. The processing circuitry may be further configured to encode, for transmission, radio resource control (RRC) signaling that indicates at least the first portion of the frequency resources allocated for GUL transmissions.

In Example 4, the subject matter of one or any combination of Examples 1-3, wherein the processing circuitry may be further configured to monitor the first portion of the frequency resources for GUL transmissions.

In Example 5, the subject matter of one or any combination of Examples 1-4, wherein the processing circuitry may be further configured to, if the GUL transmission is not successfully decoded, encode the DCI to further include a scheduling grant for a GUL retransmission by the UE.

In Example 6, the subject matter of one or any combination of Examples 1-5, wherein the DCI is first DCI. The processing circuitry may be further configured to, if the GUL transmission is not successfully decoded: attempt to decode the GUL retransmission by the UE; and encode, for transmission, second DCI that indicates the same HARQ ID of the GUL transmission and further indicates whether the GUL retransmission is decoded.

In Example 7, the subject matter of one or any combination of Examples 1-6, wherein the DCI is a first DCI. The processing circuitry may be further configured to encode, for transmission, second DCI that indicates: the SUL transmission by the other UE, and the HARQ ID selected for the SUL transmission.

In Example 8, the subject matter of one or any combination of Examples 1-7, wherein the processing circuitry may be further configured to encode the first DCI and the second DCI for transmission in a same sub-frame.

In Example 9, the subject matter of one or any combination of Examples 1-8, wherein the candidate HARQ IDs may be included in a shared pool of HARQ IDs for GUL transmissions and SUL transmissions.

In Example 10, the subject matter of one or any combination of Examples 1-9, wherein the DCI is first DCI. The processing circuitry may be further configured to encode second DCI to include a bitmap to indicate which of the candidate HARQ IDs are available for GUL transmissions. Bit positions of the bitmap may correspond to the candidate HARQ IDs in accordance with a predetermined mapping.

In Example 11, the subject matter of one or any combination of Examples 1-10, wherein the UCI may be received in a channel that is included in unlicensed spectrum. The channel may be configured for communication without an anchor carrier and in accordance with listen-before-talk (LBT) access.

In Example 12, the subject matter of one or any combination of Examples 1-11, wherein the eNB may be arranged to operate in accordance with a license assisted access (LAA) protocol.

In Example 13, the subject matter of one or any combination of Examples 1-12, wherein the apparatus may further include a transceiver to receive the UCI.

In Example 14, the subject matter of one or any combination of Examples 1-13, wherein the processing circuitry may include a baseband processor to decode the UCI.

In Example 15, a computer-readable storage medium may store instructions for execution by one or more processors to perform operations for communication by an Evolved Node-B (eNB). The operations may configure the one or more processors to decode one or more uplink control information (UCI) that indicate one or more grant-less uplink (GUL) transmissions and corresponding hybrid automatic repeat request identifiers (HARQ IDs). The operations may further configure the one or more processors to attempt to decode the GUL transmissions. The operations may further configure the one or more processors to determine, from candidate HARQ IDs, one or more available HARQ IDs for a scheduled uplink (SUL) transmission, wherein: the available HARQ IDs include the candidate HARQ IDs that are not indicated by the UCI, the available HARQ IDs include the HARQ IDs that correspond to GUL transmissions that are decoded, and the available HARQ IDs exclude the HARQ IDs that correspond to GUL transmissions that are not decoded.

In Example 16, the subject matter of Example 15, wherein the operations may further configure the one or more processors to select, from the available HARQ IDs, an HARQ ID for the SUL transmission. The operations may further configure the one or more processors to encode, for transmission, downlink control information (DCI) that indicates: the SUL transmission, and the selected HARQ ID.

In Example 17, the subject matter of one or any combination of Examples 15-16, wherein the DCI is first DCI. The operations may further configure the one or more processors to encode, for transmission, second DCI that indicates, for one of the GUL transmissions: whether the GUL transmission is decoded, and the HARQ ID corresponding to the GUL transmission.

In Example 18, the subject matter of one or any combination of Examples 15-17, wherein the operations may further configure the one or more processors to encode the first DCI and the second DCI for transmission in a same sub-frame.

In Example 19, the subject matter of one or any combination of Examples 15-18, wherein the UCI may be received in a channel that is included in unlicensed spectrum. The channel may be configured for communication without an anchor carrier and in accordance with listen-before-talk (LBT) access.

In Example 20, an apparatus of a User Equipment (UE) may comprise memory. The apparatus may further comprise processing circuitry. The processing circuitry may be configured to, as part of a listen-before-talk (LBT) technique, monitor a channel during a time period to determine whether to perform a grant-less uplink (GUL) transmission in the channel. The processing circuitry may be further configured to decode one or more downlink control information (DCI) from an Evolved Node-B (eNB). The processing circuitry may be further configured to, if none of the decoded DCIs indicates a schedule uplink (SUL) transmission by the UE: select, from candidate hybrid automatic repeat request identifiers (HARQ IDs), a HARQ ID for the GUL transmission. The processing circuitry may be further configured to, if one of the decoded DCIS indicates an SUL transmission by the UE: determine the HARQ ID for the GUL transmission as a HARQ ID that is assigned for the SUL transmission in the DCI; and refrain from performance of the SUL transmission. The memory may be configured to store information identifying the HARQ ID of the GUL transmission.

In Example 21, the subject matter of Example 20, wherein the processing circuitry may be further configured to encode, for transmission, uplink control information (UCI) that indicates the HARQ ID for the GUL transmission.

In Example 22, the subject matter of one or any combination of Examples 20-21, wherein the processing circuitry may be further configured to encode, for transmission, a physical uplink shared channel (PUSCH) for the GUL transmission.

In Example 23, the subject matter of one or any combination of Examples 20-22, wherein the channel may be included in unlicensed spectrum. The channel may be configured for communication without an anchor carrier and in accordance with the LBT technique.

In Example 24, an apparatus of an Evolved Node-B (eNB) may comprise means for decoding one or more uplink control information (UCI) that indicate one or more grant-less uplink (GUL) transmissions and corresponding hybrid automatic repeat request identifiers (HARQ IDs). The apparatus may further comprise means for attempting to decode the GUL transmissions. The apparatus may further comprise means for determining, from candidate HARQ IDs, one or more available HARQ IDs for a scheduled uplink (SUL) transmission, wherein: the available HARQ IDs include the candidate HARQ IDs that are not indicated by the UCI, the available HARQ IDs include the HARQ IDs that correspond to GUL transmissions that are decoded, and the available HARQ IDs exclude the HARQ IDs that correspond to GUL transmissions that are not decoded.

In Example 25, the subject matter of Example 24, wherein the apparatus may further comprise means for selecting, from the available HARQ IDs, an HARQ ID for the SUL transmission. The apparatus may further comprise means for encoding, for transmission, downlink control information (DCI) that indicates: the SUL transmission, and the selected HARQ ID.

In Example 26, the subject matter of one or any combination of Examples 24-25, wherein the DCI is first DCI. The apparatus may further comprise means for encoding, for transmission, second DCI that indicates, for one of the GUL transmissions: whether the GUL transmission is decoded, and the HARQ ID corresponding to the GUL transmission.

In Example 27, the subject matter of one or any combination of Examples 24-26, wherein the apparatus may further comprise means for encoding the first DCI and the second DCI for transmission in a same sub-frame.

In Example 28, the subject matter of one or any combination of Examples 24-27, wherein the UCI may be received in a channel that is included in unlicensed spectrum. The channel may be configured for communication without an anchor carrier and in accordance with listen-before-talk (LBT) access.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an Evolved Node-B (eNB), the apparatus comprising: memory; and processing circuitry, configured to:
   decode, from a User Equipment (UE), uplink control information (UCI) that indicates a hybrid automatic repeat request identifier (HARQ ID) for a grant-less uplink (GUL) transmission by the UE during a first sub-frame;
   attempt to decode the GUL transmission;
   encode, for transmission to the UE, downlink control information (DCI) that indicates the HARQ ID of the GUL transmission and further indicates whether the GUL transmission is successfully decoded;
   select, from candidate HARQ IDs, a HARQ ID for a scheduled uplink (SUL) transmission by another UE in a second sub-frame after the first sub-frame, wherein:
      if the GUL transmission is successfully decoded, the processing circuitry is configured to include the HARQ ID for the GUL transmission in the candidate HARQ IDs for the SUL transmission, and
      if the GUL transmission is not successfully decoded, the processing circuitry is configured to exclude the HARQ ID for the GUL transmission from the candidate HARQ IDs for the SUL transmission,
   wherein the memory is configured to store information identifying the HARQ ID of the GUL transmission.

2. The apparatus according to claim 1, the processing circuitry further configured to:
   attempt to decode UCIs received during a window of sub-frames prior to the first sub-frame, wherein the window is of a predetermined size; and
   exclude, from the candidate HARQ IDs for the selection of the SUL transmission by the other UE in the second sub-frame, HARQ IDs of GUL transmissions that are indicated by the decoded UCIs received during the window of sub-frames.

3. The apparatus according to claim 1, the processing circuitry further configured to:
   allocate frequency resources to include:
      a first portion for GUL transmissions without scheduling grants from the eNB, and
      a second portion for SUL transmissions based on scheduling grants from the eNB;
   encode, for transmission, radio resource control (RRC) signaling that indicates at least the first portion of the frequency resources allocated for GUL transmissions.

4. The apparatus according to claim 3, the processing circuitry further configured to:
   monitor the first portion of the frequency resources for GUL transmissions.

5. The apparatus according to claim 1, the processing circuitry further configured to:
   if the GUL transmission is not successfully decoded:
      encode the DCI to further include a scheduling grant for a GUL retransmission by the UE.

6. The apparatus according to claim 5, wherein:
   the DCI is first DCI,
   the processing circuitry is further configured to, if the GUL transmission is not successfully decoded:
      attempt to decode the GUL retransmission by the UE; and
      encode, for transmission, second DCI that indicates the same HARQ ID of the GUL transmission and further indicates whether the GUL retransmission is decoded.

7. The apparatus according to claim 1, wherein:
   the DCI is first DCI,
   the processing circuitry is further configured to encode, for transmission, second DCI that indicates:
      the SUL transmission by the other UE, and
      the HARQ ID selected for the SUL transmission.

8. The apparatus according to claim 7, the processing circuitry further configured to encode the first DCI and the second DCI for transmission in a same sub-frame.

9. The apparatus according to claim 1, wherein the candidate HARQ IDs are included in a shared pool of HARQ IDs for GUL transmissions and SUL transmissions.

10. The apparatus according to claim 9, wherein:
    the DCI is first DCI,
    the processing circuitry further configured to encode second DCI to include a bitmap to indicate which of the candidate HARQ IDs are available for GUL transmissions, and
    bit positions of the bitmap correspond to the candidate HARQ IDs in accordance with a predetermined mapping.

11. The apparatus according to claim 1, wherein:
    the UCI is received in a channel that is included in unlicensed spectrum, and
    the channel is configured for communication without an anchor carrier and in accordance with listen-before-talk (LBT) access.

12. The apparatus according to claim 11, wherein the eNB is arranged to operate in accordance with a license assisted access (LAA) protocol.

13. The apparatus according to claim 1, wherein the apparatus further includes a transceiver to receive the UCI.

14. The apparatus according to claim 1, wherein the processing circuitry includes a baseband processor to decode the UCI.

15. A computer-readable storage medium that stores instructions for execution by one or more processors to perform operations for communication by an Evolved Node-B (eNB), the operations to configure the one or more processors to:
    decode one or more uplink control information (UCI) that indicate one or more grant-less uplink (GUL) transmissions and corresponding hybrid automatic repeat request identifiers (HARQ IDs);
    attempt to decode the GUL transmissions;
    determine, from candidate HARQ IDs, one or more available HARQ IDs for a scheduled uplink (SUL) transmission, wherein:
       the available HARQ IDs include the candidate HARQ IDs that are not indicated by the UCI, the available HARQ IDs include the HARQ IDs that correspond to GUL transmissions that are decoded, and the available HARQ IDs exclude the HARQ IDs that correspond to GUL transmissions that are not decoded.

16. The computer-readable storage medium according to claim 15, the operations to further configure the one or more processors to:

select, from the available HARQ IDs, an HARQ ID for the SUL transmission; and encode, for transmission, downlink control information (DCI) that indicates:
the SUL transmission, and
the selected HARQ ID.

17. The computer-readable storage medium according to claim 16, wherein:

the DCI is first DCI, the operations further configure the one or more processors to encode, for transmission, second DCI that indicates, for one of the GUL transmissions:
whether the GUL transmission is decoded, and
the HARQ ID corresponding to the GUL transmission.

18. The computer-readable storage medium according to claim 17, the operations to further configure the one or more processors to encode the first DCI and the second DCI for transmission in a same sub-frame.

19. The computer-readable storage medium according to claim 15, wherein:

the UCI are received in a channel that is included in unlicensed spectrum, and the channel is configured for communication without an anchor carrier and in accordance with listen-before-talk (LBT) access.

20. An apparatus of a User Equipment (UE), the apparatus comprising: memory; and processing circuitry, configured to:

as part of a listen-before-talk (LBT) technique, monitor a channel during a time period to determine whether to perform a grant-less uplink (GUL) transmission in the channel;

decode one or more downlink control information (DCI) from an Evolved Node-B (eNB);

if none of the decoded DCIs indicates a schedule uplink (SUL) transmission by the UE:
select, from candidate hybrid automatic repeat request identifiers (HARQ IDs), a HARQ ID for the GUL transmission;

if one of the decoded DCIs indicates an SUL transmission by the UE:
determine the HARQ ID for the GUL transmission as a HARQ ID that is assigned for the SUL transmission in the DCI; and
refrain from performance of the SUL transmission, wherein the memory is configured to store information identifying the HARQ ID of the GUL transmission.

21. The apparatus according to claim 20, the processing circuitry further configured to:

encode, for transmission, uplink control information (UCI) that indicates the HARQ ID for the GUL transmission.

22. The apparatus according to claim 20, the processing circuitry further configured to:

encode, for transmission, a physical uplink shared channel (PUSCH) for the GUL transmission.

23. The apparatus according to claim 22, wherein:

the channel is included in unlicensed spectrum, and the channel is configured for communication without an anchor carrier and in accordance with the LBT technique.

* * * * *